(12) United States Patent
Gao et al.

(10) Patent No.: US 11,421,561 B2
(45) Date of Patent: Aug. 23, 2022

(54) SYNCHRONOUS BELT DRIVE SYSTEM

(71) Applicant: GATES CORPORATION, Denver, CO (US)

(72) Inventors: Min Gao, Jiangsu (CN); Cindy Decker, Columbia, MO (US); Carol Weber, Englewood, CO (US); Douglas D. Schelhaas, Aurora, CO (US); Kevin Ward, Dumfries & Galloway (GB); Leslee Brown, Broomfield, CO (US); William Fraser Lacy, Westland, MI (US); Guogong Chen, Kunshan (CN); John Muri, Dumfries & Galloway (GB); Cindy Cookson, Englewood, CO (US); Jennifer E. Pease, Lakewood, CO (US); Justin Paulsen, Englewood, CO (US); Patrick Joseph McNamee, Monument, CO (US); Shawn Xiang Wu, Rochester Hills, MI (US); Andrzej Dec, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 404 days.

(21) Appl. No.: 16/735,523

(22) Filed: Jan. 6, 2020

(65) Prior Publication Data
US 2020/0141283 A1  May 7, 2020

Related U.S. Application Data

(63) Continuation of application No. PCT/US2018/040965, filed on Jul. 5, 2018, which is
(Continued)

(51) Int. Cl.
*F01L 1/02* (2006.01)
*F16H 7/02* (2006.01)
(Continued)

(52) U.S. Cl.
CPC ............. *F01L 1/024* (2013.01); *F16G 1/04* (2013.01); *F16G 1/28* (2013.01); *F16H 7/023* (2013.01);
(Continued)

(58) Field of Classification Search
CPC ............. F16H 2007/081; F16H 7/1281; F16H 2007/0893; F16H 55/084; F16H 2035/003;
(Continued)

(56) References Cited

U.S. PATENT DOCUMENTS 3,583,250 A * 6/1971 Kongelka ............. F16H 55/171
474/133
4,605,387 A * 8/1986 Okubo ................. F16H 7/1281
474/135
(Continued)

FOREIGN PATENT DOCUMENTS

EP           425246 A1    5/1991

OTHER PUBLICATIONS

European Patent Office, International Search Report and Written Opinion of the International Searching Authority, International application No. PCT/US2018/040965, dated Mar. 6, 2019.
(Continued)

*Primary Examiner* — Henry Y Liu
(74) *Attorney, Agent, or Firm* — Alyssa K. Sandrowitz, Esq.; Kevin J. Aiken, Esq.

(57) ABSTRACT

A synchronous belt drive system having: a synchronous belt with a tensile cord of high-modulus fiber such as glass, carbon, PBO, or aramid; a driver sprocket and at least one driven sprocket, at least one of which is an obround sprocket; and a tensioner having: a base having a cylindrical portion extending axially with a radially outer surface and a receiving portion, an eccentric arm pivotally engaged with
(Continued)

the radially outer surface, a torsion spring disposed within the receiving portion, the torsion spring applying a biasing force to the eccentric arm, and a pulley journalled to the eccentric arm. Preferably, no one of the eccentric arm, pulley, or torsion spring is axially displaced along an axis A-A from the others. The obround sprocket has a toothed surface and at least one linear portion disposed between two arcuate portions having a constant radius, the linear portion having a predetermined length.

12 Claims, 23 Drawing Sheets

Related U.S. Application Data a continuation-in-part of application No. 15/642,041, filed on Jul. 5, 2017, now Pat. No. 11,193,563.

(51) Int. Cl.
| | |
|---|---|
| F16G 1/04 | (2006.01) |
| F16H 55/08 | (2006.01) |
| F16H 55/17 | (2006.01) |
| F16H 7/12 | (2006.01) |
| F16G 1/28 | (2006.01) |
| F16H 7/08 | (2006.01) |

(52) U.S. Cl.
CPC ......... *F16H 7/1281* (2013.01); *F16H 55/084* (2013.01); *F16H 55/171* (2013.01); *F16H 2007/081* (2013.01); *F16H 2007/0865* (2013.01); *F16H 2007/0893* (2013.01)

(58) Field of Classification Search
CPC ... F01L 1/022; F01L 1/024; F01L 1/02; F01L 2810/03
USPC .......................................... 474/135, 112, 141
See application file for complete search history.

(56) References Cited

U.S. PATENT DOCUMENTS

| | | | | |
|---|---|---|---|---|
| 4,725,260 A * | 2/1988 | Komorowski | ........ | F16H 7/1218 474/135 |
| 5,178,108 A * | 1/1993 | Beaber | ........ | F16H 7/06 123/90.31 |
| 5,620,385 A * | 4/1997 | Cascionale | ........ | F16H 7/1218 474/135 |
| 5,931,052 A * | 8/1999 | Zhao | ........ | F16F 15/315 123/192.1 |
| 5,964,674 A * | 10/1999 | Serkh | ........ | F16H 7/1218 474/135 |
| 6,213,905 B1 * | 4/2001 | White | ........ | F16H 7/06 474/148 |
| 6,217,470 B1 * | 4/2001 | Quintus | ........ | F16H 7/1218 474/135 |
| 6,609,988 B1 * | 8/2003 | Liu | ........ | F16H 7/1218 474/135 |
| 6,877,467 B2 * | 4/2005 | Katayama | ........ | F02B 75/22 123/90.31 |
| 7,044,875 B2 * | 5/2006 | Gajewski | ........ | F01L 1/022 474/148 |
| 7,232,391 B2 | 6/2007 | Gajewski | | |
| 7,461,624 B2 * | 12/2008 | Ullein | ........ | F16F 15/264 123/192.2 |
| 7,493,880 B2 * | 2/2009 | Gajewski | ........ | F01L 1/022 123/90.31 |
| 7,540,817 B2 * | 6/2009 | Hashimoto | ........ | F16H 7/0848 192/81 C |
| 7,720,650 B2 * | 5/2010 | Gajewski | ........ | F16H 9/24 703/7 |
| 7,857,720 B2 * | 12/2010 | Lacy | ........ | F16H 7/023 474/148 |
| 8,042,507 B2 * | 10/2011 | Gajewski | ........ | F16H 35/02 123/90.31 |
| 8,292,765 B2 * | 10/2012 | Rolando | ........ | F16H 7/1245 184/6.17 |
| 8,303,444 B2 | 11/2012 | Gajewski | | |
| 8,342,993 B2 * | 1/2013 | Gajewski | ........ | F16H 35/02 474/148 |
| 8,430,775 B2 * | 4/2013 | Todd | ........ | F01L 1/022 474/160 |
| 8,475,308 B2 * | 7/2013 | Crist | ........ | F16H 7/1218 474/135 |
| 8,550,945 B2 * | 10/2013 | Gajewski | ........ | F16H 55/36 474/166 |
| 9,618,098 B2 * | 4/2017 | Ward | ........ | F16H 7/1281 |
| 9,869,379 B2 * | 1/2018 | Frankowski | ........ | F16H 7/1218 |
| 9,927,001 B2 * | 3/2018 | Di Meco | ........ | F16H 57/0489 |
| 2002/0177499 A1 * | 11/2002 | Ayukawa | ........ | F16H 7/1218 474/138 |
| 2003/0087714 A1 * | 5/2003 | Todd | ........ | F16H 55/30 474/202 |
| 2003/0104886 A1 * | 6/2003 | Gajewski | ........ | F01L 1/356 474/87 |
| 2006/0068957 A1 * | 3/2006 | Stone | ........ | F16H 7/1281 474/135 |
| 2006/0258497 A1 * | 11/2006 | Dec | ........ | F16H 7/1218 474/112 |
| 2007/0066430 A1 * | 3/2007 | Gajewski | ........ | F16H 55/30 474/141 |
| 2008/0085799 A1 * | 4/2008 | Lacy | ........ | F01L 1/024 474/141 |
| 2008/0287233 A1 * | 11/2008 | Cantatore | ........ | F16H 7/1218 474/112 |
| 2008/0318719 A1 * | 12/2008 | Izu | ........ | F16G 1/28 474/205 |
| 2010/0120566 A1 * | 5/2010 | Izu | ........ | F16G 1/28 474/205 |
| 2010/0160100 A1 * | 6/2010 | Gajewski | ........ | F16H 35/02 474/152 |
| 2010/0190595 A1 * | 7/2010 | Baumuller | ........ | F16H 7/1281 474/112 |
| 2011/0045929 A1 * | 2/2011 | Rolando | ........ | F16H 7/1218 474/112 |
| 2014/0080647 A1 * | 3/2014 | Sakamoto | ........ | F16G 1/28 474/205 |

OTHER PUBLICATIONS

NGF News: Latest News: Belt in Oil (BiO) wins again, Jun. 23, 2016, http://www.ngfglasscord.com/en-gb/news/latest-news/belt-in-oil-bio-wins-again, 1 page, Nippon Sheet Glass Co., Ltd., Tokyo, Japan, copyright 2018.
Continental: Contitech—Oil pump drive, Drive Belts for Oil Pumps in Passenger Car OEM Equipment, https://www.contitech.de/en-GL/Solutions/Power-Transmission/Passenger-cars-OE/Oil-pump-drive, 2 pages, copyright 2018.
Dayco Products LLC, Timing Belt-In-Oil (BIO) System, https://www.dayco.com/timing-belt-in-oil-bio-system, 3 pages, Troy, MI, United States.
Wikipedia: Ford EcoBoost engine, https://en.wikipedia.org/wiki/Ford_EcoBoost_engine, 14 pages.
NGF News, Latest News: Ford's new Panther two-litre EcoBlue advanced diesel engine uses Belt in Oil Technology, May 17, 2016, http://www.ngfglasscord.com/en-gb/news/latest-news/fords-new-panther-two-litre-ecoblue-advanced-diesel-engine-uses-belt-in . . . , 1 page, Nippon Sheet Glass Co., Ltd, Tokyo, Japan, copyright 2018.
AutoServiceWorld: AutoServiceWorld News, Jun. 2, 2016, Talking Tech: Keeping things in time, by Jeff Taylor; https://www.autoserviceworld.com/carsmagazine/talking-tech-keeping-things-time/, 6 pages.

* cited by examiner

LOAD CHARACTER OF DRIVEN PULLEY

SYNCHRONOUS BELT DRIVE SYSTEM

BACKGROUND OF THE INVENTION

1. Field of the Invention

This invention relates generally to a synchronous belt drive system such as used in internal combustion engines, including a timing belt, automatic mechanical tensioner, driver pulley, and one or more driven pulleys, at least one of which pulleys is obround, more particularly to a belt drive system suitable for running in oil and having a much narrower package width than known systems.

2. Description of the Prior Art

Most synchronous belt drive systems for engines have been mounted on the front of the engine, outside the engine block. The timing belts may run without lubrication in such a so-called "dry" belt application. A consequence of this approach is that the drive shaft and cam shaft(s) must exit the block through oil seals which may be prone to leak over time. A benefit is the relative ease in accommodating the width of the belt drive in the engine compartment, i.e., the relative lack of constraints on the drive system width. Nevertheless, some engine compartments have limited space, and vehicle weight reduction is desirable, so that a narrower dry belt drive system that can handle the same drive loads, tensions and timing requirements at a reduced system weight and width could be desirable. "Width" herein refers to a dimension of the drive system or a drive component in the axial direction, i.e., a direction perpendicular to the plane of the drive as would be viewed in a layout diagram of the drive.

Timing chains for internal combustion engines are generally mounted inside the engine where they are easily lubricated. Another engine-timing approach is to mount a synchronous belt drive system inside the engine block, analogous to the design of timing chain drives. This approach may reduce the number of seals needed on shafts. This approach may require more constraints on system width to avoid the expense of an oversized engine block and when matching the width of a timing chain drive for the same application. In addition, this so-called "wet" belt application requires that the belt materials have excellent resistance to oil and other engine fluids. Thus, a narrower, wet-belt, drive system that can directly replace a timing chain system, handle the same drive loads, tensions, and timing requirements at a reduced system weight, while running in contact with oil could be desirable.

As an example, one known commercial belt-in-oil timing drive system has a belt that is about 18 mm wide, with round pulleys that are about 19-23 mm wide, and a conventional tensioner occupying a width of about 35-38 mm. The peak timing error is believed to be typically about 2° peak-peak. The system mass is reported to be around 2500 g total including the VVT components, and around 1700 g without VVT.

U.S. Pat. No. 9,927,001 (Dayco Europe SRL) is representative of the art. Therein a belt life test is described using a 19-mm wide belt running in contact with oil.

It would be desirable to reduce overall system width to less than 18 mm, i.e., less than half the typical current system width. To do this would at least require a somewhat narrower belt and pulleys and a much narrower tensioner. This would not be an easy task, because reducing belt width is expected to increase belt tensile strains, contact pressures, and tooth deflections which could in turn increase the timing errors and accelerate belt degradation, thus decreasing timing system performance and life expectancy. What would be desirable would be to reduce system width to 20 mm or less and weight commensurately, while simultaneously reducing timing error about 50% and without loss of belt life.

SUMMARY OF THE INVENTION

The present invention is directed to systems and methods which provide a narrower, wet- or dry-belt, timing-drive system that can handle typical drive loads, tensions, and timing requirements at a reduced system weight and width.

The invention relates to a system with a high-modulus timing belt, an obround sprocket, and a narrow profile, automatic, mechanical tensioner. The high modulus timing belt preferably has a tensile cord of high-modulus fiber such as high-modulus-glass fiber, carbon fiber, PBO, or aramid, including hybrids thereof. The obround sprocket has a phasing and magnitude selected to reduce timing error to less than 1.5° peak-to-peak, preferably less than 1.0° peak-to-peak. The obround sprocket has a toothed surface and at least one linear portion disposed between two arcuate portions having a constant radius, the linear portion having a predetermined length. The tensioner has a damping and tension selected to maintain slack side belt tension, preferably in the range of 100 N to 600 N, preferably with torsional spring and asymmetric damping. The tensioner may preferably have: a base having a cylindrical portion extending axially with a radially outer surface and a receiving portion, an eccentric arm pivotally engaged with the radially outer surface, a torsion spring disposed within the receiving portion, the torsion spring applying a biasing force to the eccentric arm, and a pulley journalled to the eccentric arm. Preferably, no one of the eccentric arm, pulley, or torsion spring is axially displaced along an axis A-A from the others.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention.

DETAILED DESCRIPTION

The invention relates to a synchronous belt drive system that includes a high-modulus timing belt, one or more obround sprockets, and an automatic mechanical tensioner of narrow design. The high-modulus timing belt preferably has a tensile modulus that is about twice the modulus of a timing belt of similar width but with conventional fiberglass tensile member. The high-modulus timing belt is preferably constructed with heat-resistant and oil-resistant materials. The obround sprocket preferably has a magnitude and a phase such that an angular displacement timing error between a sprocket and the obround sprocket is less than 1.5 degree peak-to-peak. The automatic mechanical tensioner may include a base having a cylindrical portion extending axially, the cylindrical portion comprising a radially outer surface and a receiving portion that is radially inward of the radially outer surface, an eccentric arm pivotally engaged with the radially outer surface, a torsion spring disposed within the radially inward receiving portion, the torsion spring applying a biasing force to the eccentric arm, and a pulley journalled to the eccentric arm. Preferably the eccentric arm, the pulley and the torsion spring are concentrically arranged such that no one of the eccentric arm, pulley or torsion spring is axially displaced along an axis A-A from either of the eccentric arm, pulley or torsion spring, resulting in minimum width.

The High-Modulus Timing Belt.

Figure 34:
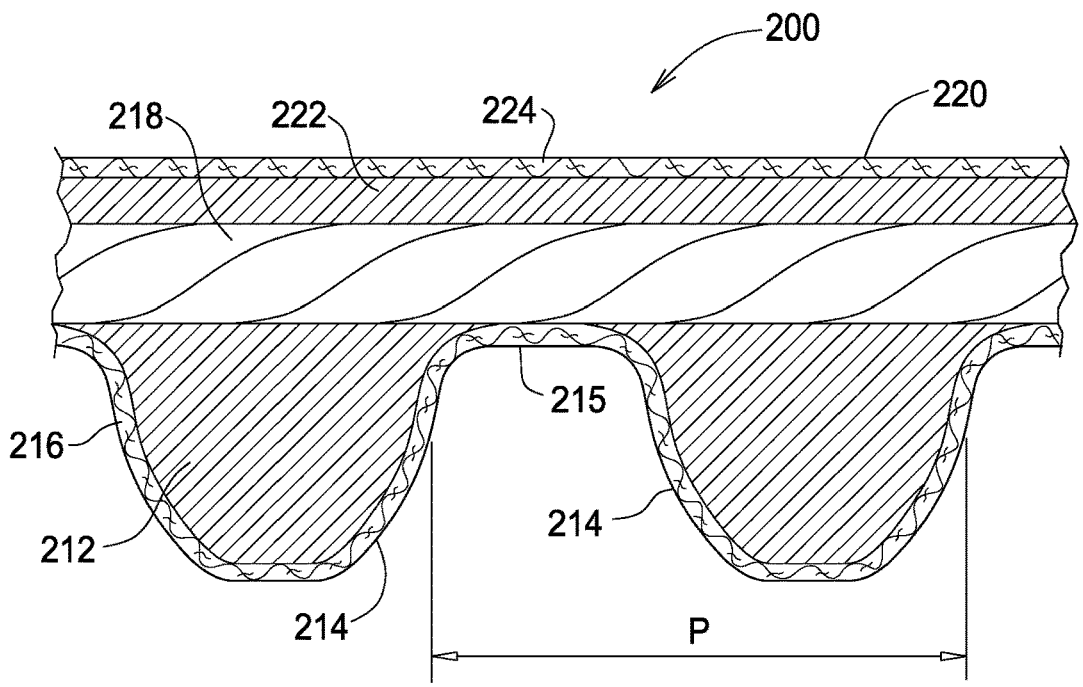
FIG. 34 is a partially fragmented view of a synchronous belt.

The construction of synchronous belt 200 is illustrated in FIG. 34. Belt 200 includes teeth 214 on one side, which alternate with lands 212, and smooth back side 220. The body rubber or elastomer includes tooth rubber 212 and back rubber 222. The toothed side is covered with tooth jacket 216 and the back side 220 is covered with back jacket 224. The tooth repeat length is the pitch, "P." The tensile member 218 is embedded in the belt body rubber and gives the belt its high modulus.

The tooth jacket 216 includes a fabric and one or more treatments to enhance one or more belt properties, for example, adhesion, oil resistance, wear resistance, and the like, as well as system performance properties such as timing error and durability. The fabric treatment may be any suitable treatment known in the art. Likewise the back jacket 224 may include a fabric and one or more of the same or different treatments as the tooth jacket. The term "jacket" is thus used to describe a fabric with one or more treatments included which is generally the form in which it is ready for assembly into the belt. "Fabric" generally refers to the greige woven, non-woven, or knit material before applying treatments.

The tooth fabric may be any suitable woven, knit, or non-woven fabric of suitable stretch, strength, wear resistance, thermal resistance, and environmental resistance, as needed for the application. For use in a flow-through belt-building process, (defined later), a longitudinal stretch over 80%, or over 100%, is preferable. For a preform process, a much lower stretch may be suitable, or no significant stretch may be suitable. The fabric may include high-strength, oil, wear and heat resistant fibers such as nylon, aramid, PPS, PEEK, polyester, and combinations thereof. Yarns of sufficient stretch may be obtained by any known suitable method, including texturizing, wrapping an elastic core, orienting on a bias, and combinations thereof.

The back fabric may be any suitable woven, knit, or non-woven fabric of suitable stretch, strength, wear resistance, thermal resistance (hot or cold), and environmental resistance for the application. Generally there are no particular requirements for any amount of stretch for the back fabric since it will just lay flat on the back of the belt. Some degree of stretch may be preferred to maintain belt flexibility. Back fabric has been found to improve cold temperature resistance, reducing back cracking from repeated cold starts.

A preferred fabric treatment includes the epoxy or epoxy-rubber treatment, with optional RFL treatment, described in U.S. Pat. Pub. No. 2014/0080647A1 to Yamada et al., which is incorporated herein by reference. Such a treatment is intended to improve the wear resistance and oil- and water-resistance of a tooth jacket, and to provide a toothed belt that has satisfactory durability even when used under high-temperature and high-load conditions or within an oil or water environment.

Any suitable rubber composition(s) may be used for the tooth rubber 212 or back rubber 222. In addition, there may be other layers of rubber as needed, such as an adhesion rubber layer in contact with the tensile cord 218, or other layers. The same or different compounds may be used in the tooth, in the tensile cord layer, on the back side and elsewhere in the belt, as desired. U.S. Pat. No. 6,358,171 B1 to Whitfield, which is hereby incorporated herein by reference, describes exemplary rubber compounds for the tooth rubber or belt body rubber. As described therein the belt body rubber composition may include a nitrile-group containing copolymer rubber such as HNBR and the rubber may include a third monomer which lowers the glass transition of the rubber. The rubber composition may also include from about 0.5 to about 50 parts by weight of rubber (PHR) of a fiber reinforcement. U.S. Pat. No. 9,140,329 B2, which is hereby incorporated herein by reference, describes other exemplary rubber compounds for the tooth rubber or belt body rubber. As described therein, the belt body rubber composition may include HNBR or HXNBR rubber, resorcinol, and a melamine compound.

The rubber composition(s) of the belt body may furthermore include additional ingredients known in the art, such as fillers, plasticizers, anti-degradants, processing aids, curatives, coagents, compatibilizers, and the like.

The tensile cord 218 for the belt may be any known in the art, but preferably comprises fiber glass, PBO, aramid, carbon fiber or a hybrid of two or more of the foregoing. The tensile cord preferably includes an adhesive treatment that is highly resistant to oil for use in oil-wet environments. For example, the adhesive treatment may be based on nitrile-containing latex or rubber, or other oil-resistant materials. A preferred tensile cord comprises carbon fiber such as disclosed in U.S. Pat. No. 6,945,891 to Knutson, or a glass/carbon hybrid cord such as described in U.S. Pat. No. 7,682,274 to Akiyama et al. Preferred fiber glass for a tensile cord comprises high-strength fiber glass such as K-glass, U-glass, M-glass, or S-glass.

The toothed belts of the invention may be manufactured according to known methods of making belts. The most common approach is to apply the various materials to a grooved mandrel, beginning with the tooth cover jacket, then the tensile cord and body rubber, and ending with the back jacket. The mandrel with the belt slab is then inserted in to a pressurizable shell which can be heated and pressurized to squeeze the materials together, causing the rubber to flow into the teeth grooves pushing the tooth jacket into the shape of the grooves (known as the "flow-through" method). Alternately, the tooth jacket can be preformed into the approximate groove shape, optionally with rubber filling the teeth, before or while placing the tooth jacket on the mandrel (the "preform method"). Other variations on these methods are also possible. The primary additional feature for making a fabric-backed belt is that the rubber layers must be carefully measured to obtain the desired final belt thickness, since the back of the belt cannot be ground to size as is done for rubber-backed belts.

The rubber compound generally has a modulus level which contributes significantly to the tooth stiffness and the load capacity of the tooth and the timing belt. Likewise, the tooth cover jacket contributes reinforcement to the tooth which also contributes to the tooth stiffness and load capacity of the belt. The tensile cord generally dominates the tensile properties of the timing belt, such as modulus (or span stiffness) and strength. Optimizing the combination of belt span stiffness and tooth stiffness by choice of these materials has been found to allow a narrower belt to have the same system timing error while reducing system loads and minimizing strength needed in the belt. Increasing the span stiffness in particular relative to that of the conventional belt with fiberglass cord has a desirable effect. A series of belts with up to double the span stiffness and with the same tooth stiffness had the same system timing error but reduced the system maximum belt tension, maximum belt effective tension, and maximum tensioner span tension in computerized simulations.

The Obround Sprocket.

The invention comprises a synchronous belt drive system comprising a first obround sprocket (10) having a toothed surface and at least one linear portion (16) disposed between two arcuate portions (14,15), the arcuate portions having a constant radius (R1, R2), the linear portion having a predetermined length, a sprocket (300) having a toothed surface, the sprocket engaged to the first obround sprocket by an endless toothed member (200), and the first obround sprocket (10) having a magnitude and a phase such that an angular displacement timing error between the sprocket and the first obround sprocket is less than 1.5 degree peak-to-peak.

Figure 1:
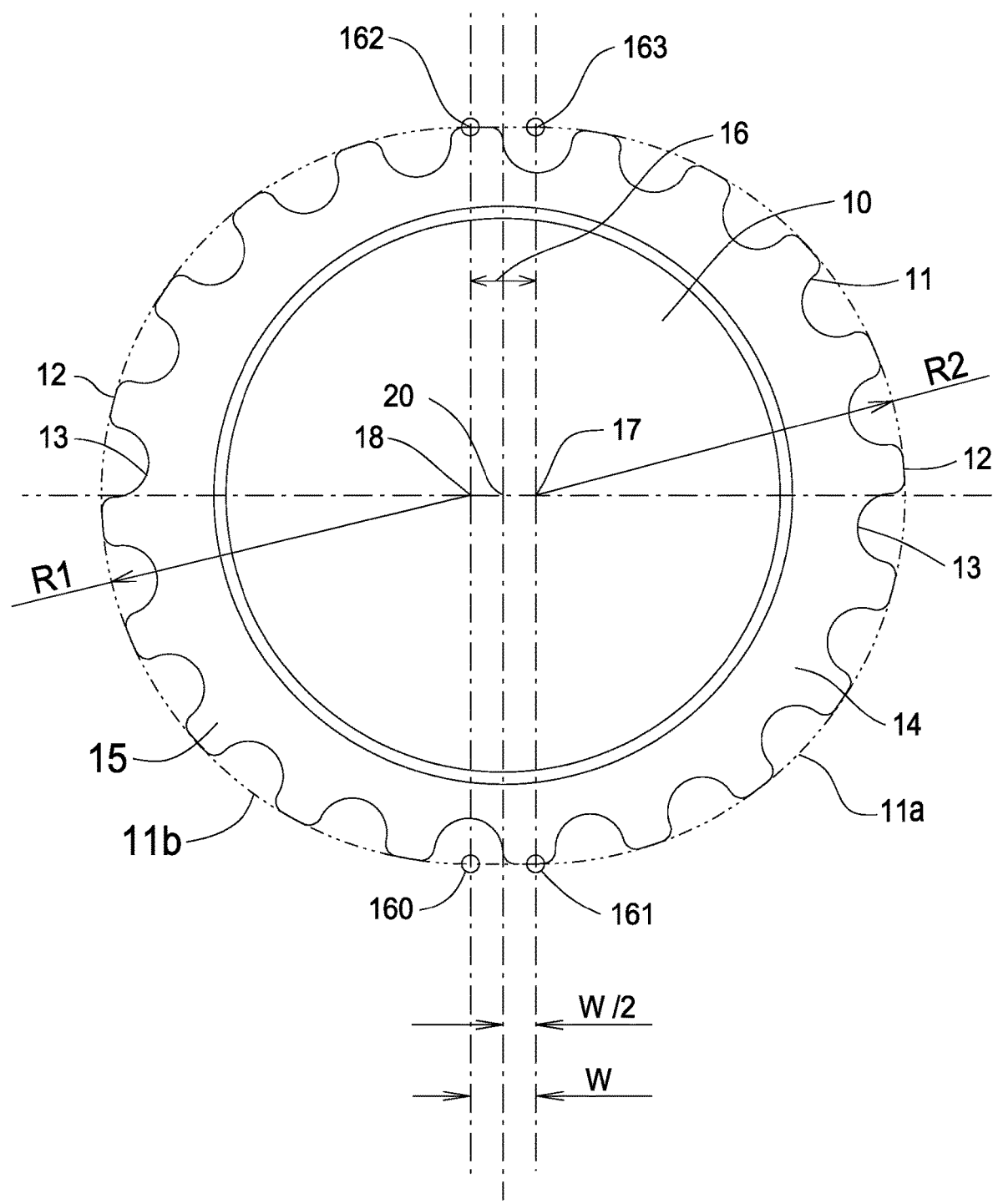
FIG. 1 is a side view of an obround sprocket.

FIG. 1 is a side view of an obround sprocket. The inventive sprocket 10 comprises a toothed surface 11. Toothed surface 11 engages a toothed belt. Toothed surface 11 comprises land areas 12 and adjacent grooves 13. The grooves 13 have a shape that is compatible with the corresponding design of a tooth form of a toothed belt. Toothed belts are also referred to as synchronous belts since they are used to synchronize the rotation of a driver and driven sprocket.

Sprocket 10 comprises portion 14 and portion 15. Portion 14 has an arcuate toothed surface 11a which comprises a constant radius R2. Portion 15 has an arcuate toothed surface 11b which comprises a constant radius R1. Portions 14 and 15 are segments of a circle since the radii R1 and R2 are equal and constant. Use of circular segments in this manner reduces the complexity of the design and manufacturing process for the inventive sprocket.

Disposed between portion 14 and portion 15 is linear portion 16. Portion 16 comprises a rectangular section which has the effect of displacing each portion 14 and 15 from each other, thus giving the obround shape to the sprocket. The sprocket surface 11 is straight, i.e., linear or flat between points 160 and 161, and 162 and 163.

The flat portion 16 has a length which relates to a system torque fluctuation amplitude. In this embodiment portion 16 has a dimension (W) of approximately 2 mm between points 160 and 161, and 162 and 163. Hence, the center of curvature 17 of portion 14 is displaced by a distance of W/2, approximately 1 mm, from the center of rotation 20 of the sprocket, which is called the "magnitude" of eccentricity of the obround sprocket. Also, the center of curvature 18 of portion 15 is displaced by a distance of W/2, approximately 1 mm, from the center of rotation 20 of the sprocket. The dimensions given are only for the purpose of illustration and are not intended to be limiting. It also follows that a major axis of the sprocket has a length dimension:

$$L_{major} = R1 + R2 + W.$$

A major segment (MG) for each portion 14, 15 has a dimension:

$$MG = (R1 + W/2) \text{ or } (R2 + W/2).$$

A minor axis of the sprocket has a length dimension:

$$L_{minor} = R1 + R2.$$

A more general definition of magnitude, which might also be more useful for sprockets with more than two lobes, is the difference between the maximum major segment and the minimum minor segment (i.e., MG−R1 or MG−R2 in this two-lobe case). In the symmetric two-lobe case, the magnitude is just W/2. In assymetric designs or with more than two lobes, there will be small deviations from W/2.

The length (W) of portion 16 is determined by the radius of portions 14 and 15 and is dependent on the dynamic angular vibration characteristic which is being counteracted which is described elsewhere in this specification. Sprocket 10 can be designed using constant surface pitch, constant angular pitch or a combination of the two. "Surface Pitch" is defined as the distance between any two consecutive, corresponding, "pitch points" on the OD of the sprocket, measured around the OD line. Constant Surface Pitch is calculated as follows:

$$SP = (((((Ng \times \text{Nom Pitch})/Pi) - PLD) \times Pi)/Ng),$$

where
SP=Surface Pitch,
Ng=Number of grooves in the sprocket,
Nom Pitch=Nominal system pitch,
Pi=~3.141, and
PLD=Diametral PLD of the system.

"Angular Pitch" is defined as the angular difference between any two consecutive, corresponding "pitch points" on a sprocket and may be measured in degrees or radians. Constant Angular Pitch is defined as follows:

$$AP = 360/Ng (\text{Degrees}),$$

where
AP=Angular Pitch, and
Ng=Number of grooves in sprocket.

The sprocket groove profile can be individually designed to suit the particular dynamics of the engine.

The elastic modulus of the span of the belt, in combination with the tooth modulus and the sprocket offset (W/2) is optimized to substantially reduce or cancel tension fluctuations at predetermined engine speeds. Consequently, in this application the belt is analyzed and designed as a spring member of the system in addition to being sized to transmit the required tensile loads. The system dynamic response is selected by iterative process to arrive at a combination of belt modulus and obround sprocket radius (R1 and R2) which substantially reduces or cancels all of the tension fluctuations otherwise transmitted through the belt and the belt drive system.

Figure 2:
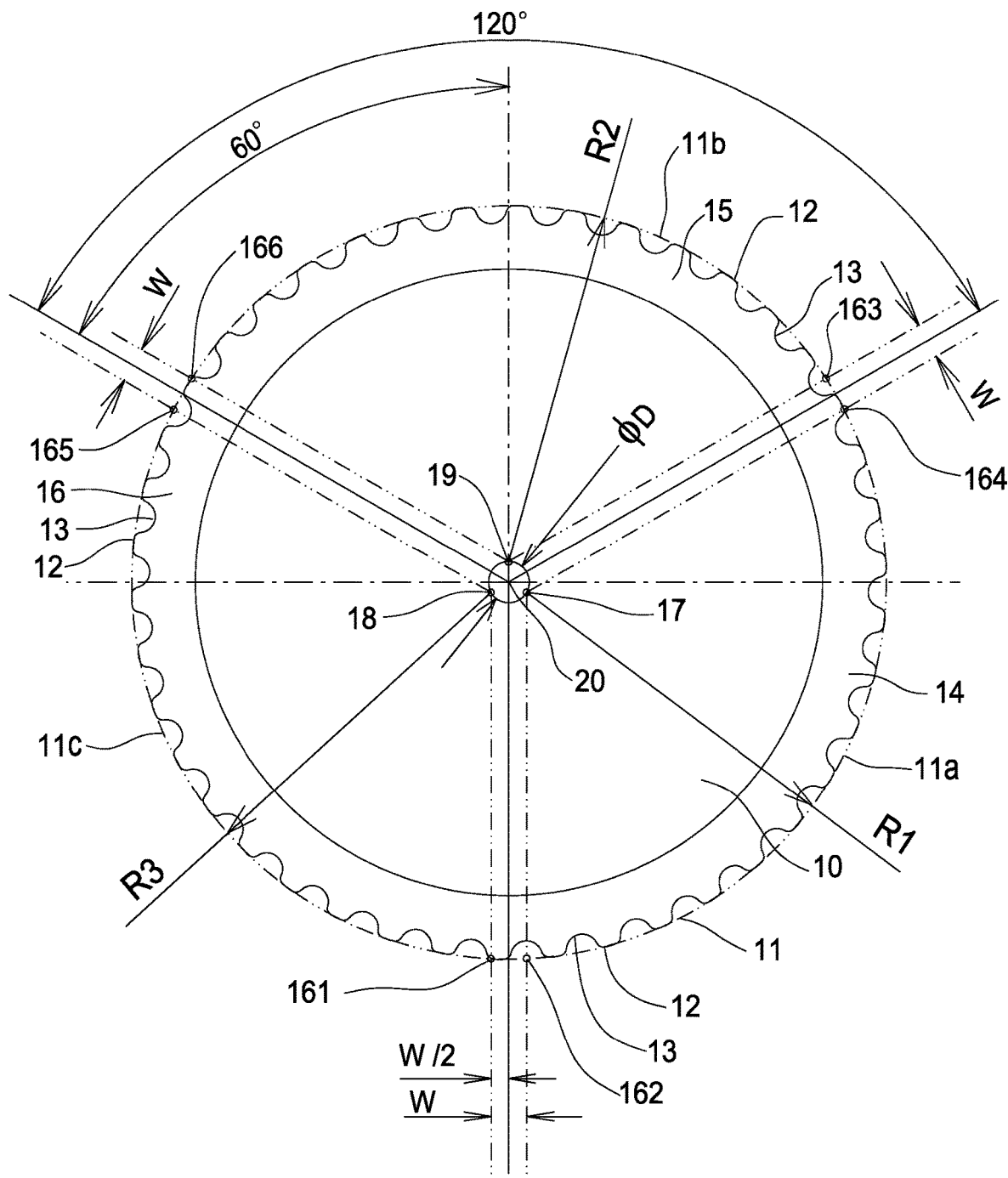
FIG. 2 is a side view of an alternative obround sprocket.
Figure 9:
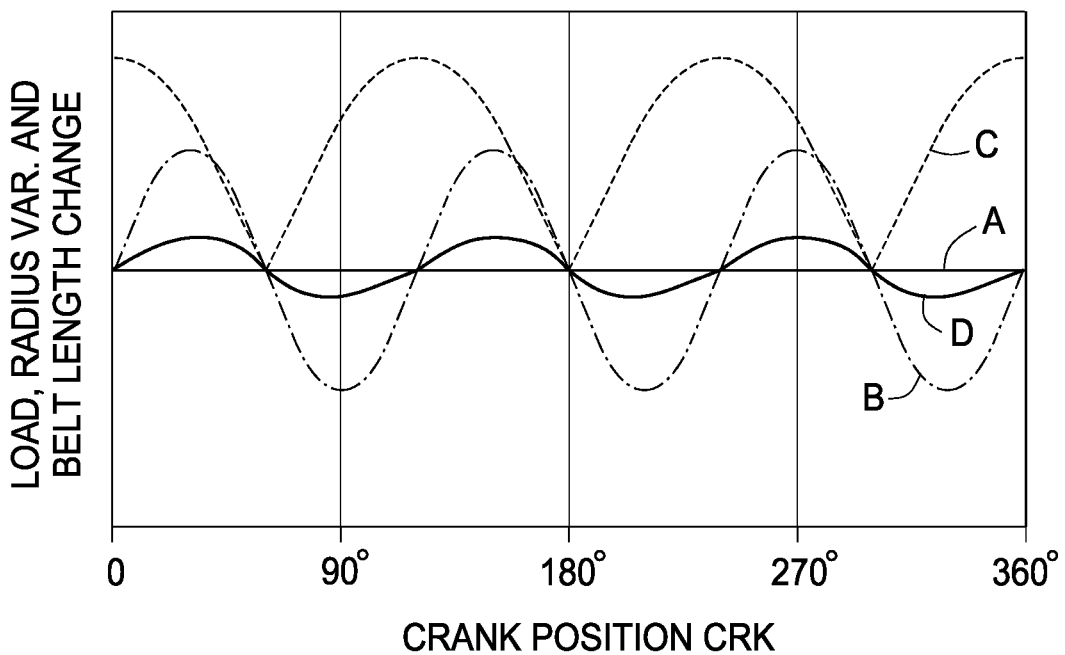
FIG. 9 is representative of the $1.5^{th}$ order load characteristic for a driver sprocket of a four-cylinder, four-stroke, common rail diesel engine with 3 piston fuel pump, (or other device inducing a $1.5^{th}$ order).

FIG. 2 is a side view of an alternate embodiment of the sprocket. This embodiment comprises three linear segments disposed between arcuate portions 14, 15, 16 as otherwise described in FIG. 1. The three linear segments (161 to 162) and (163 to 164) and (165 to 166) are disposed between each arcuate portion 14, 15, 16. Each arcuate portion 14, 15, 16 comprises, respectively, constant and equal radii R1, R2, R3. The three linear segments are equally spaced about the circumference of the sprocket at intervals of approximately 120°. FIG. 9 is representative of the $1.5^{th}$ order load characteristic in a system using the sprocket shown in FIG. 2.

Figure 3:
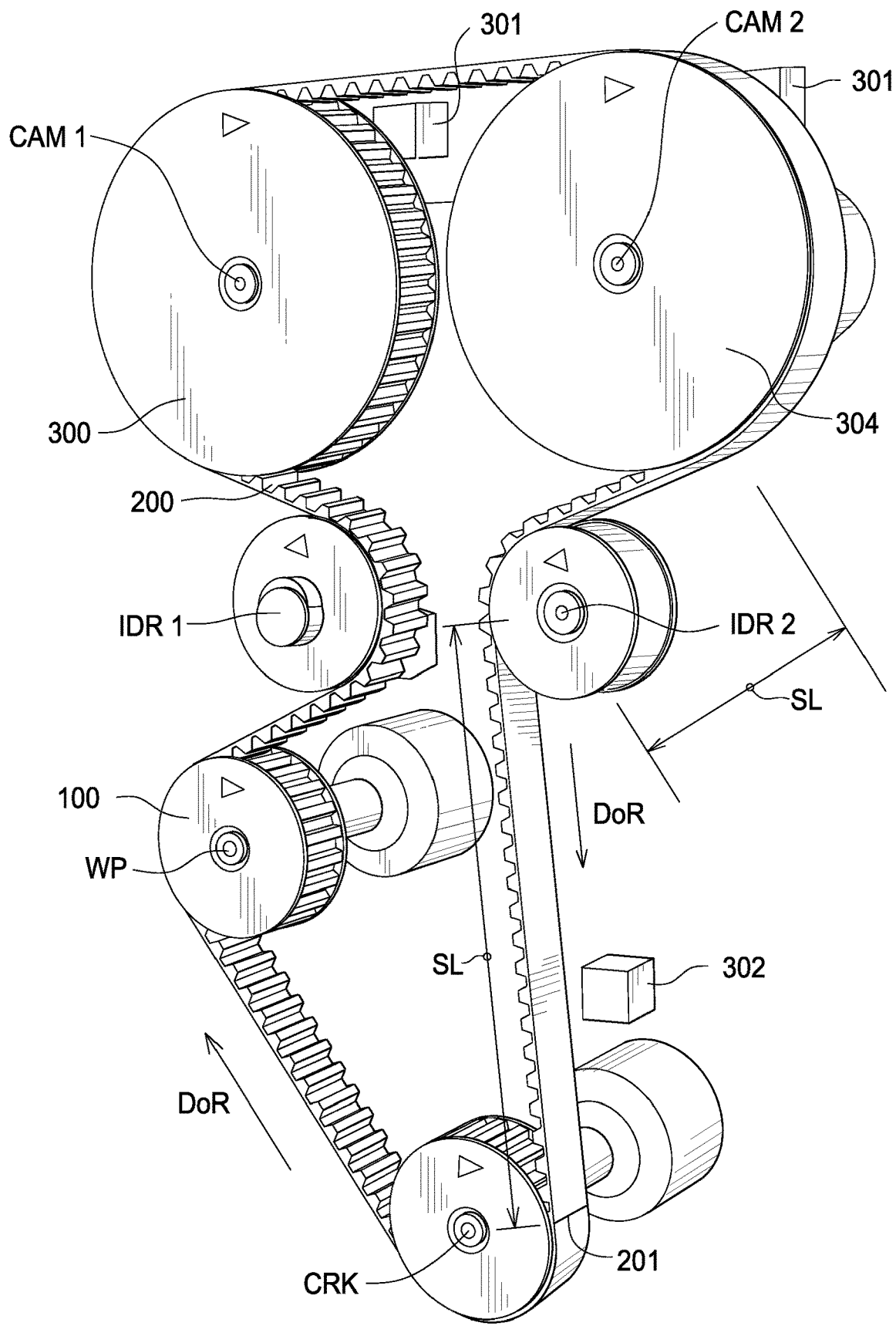
FIG. 3 is a perspective view of a twin cam, in-line four-cylinder, four-stroke, gasoline engine.
Figure 4:
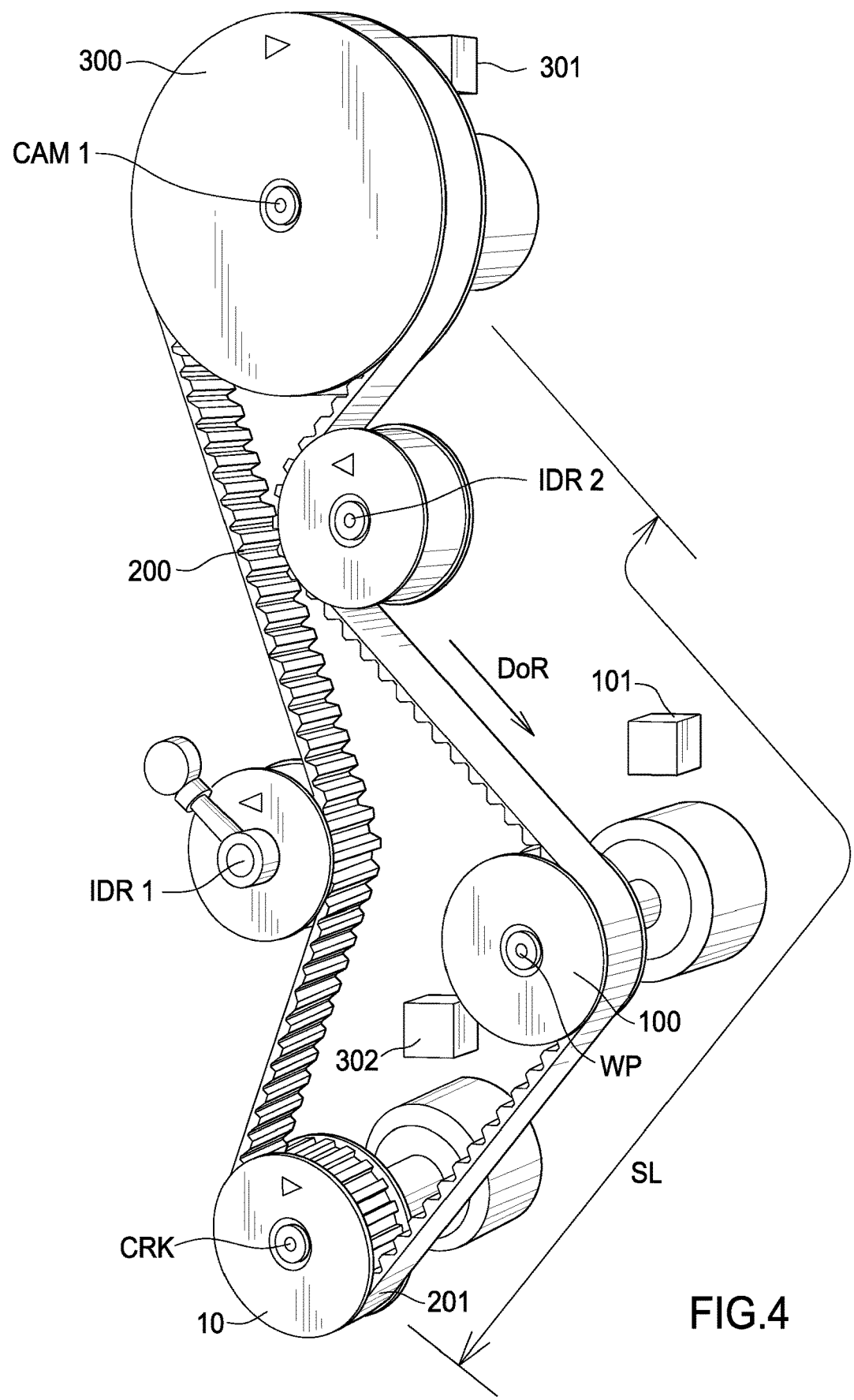
FIG. 4 is a perspective view of a single cam, in-line four-cylinder, four-stroke, diesel driven engine which has a fuel pump driven at the rear of the camshaft.
Figure 5:
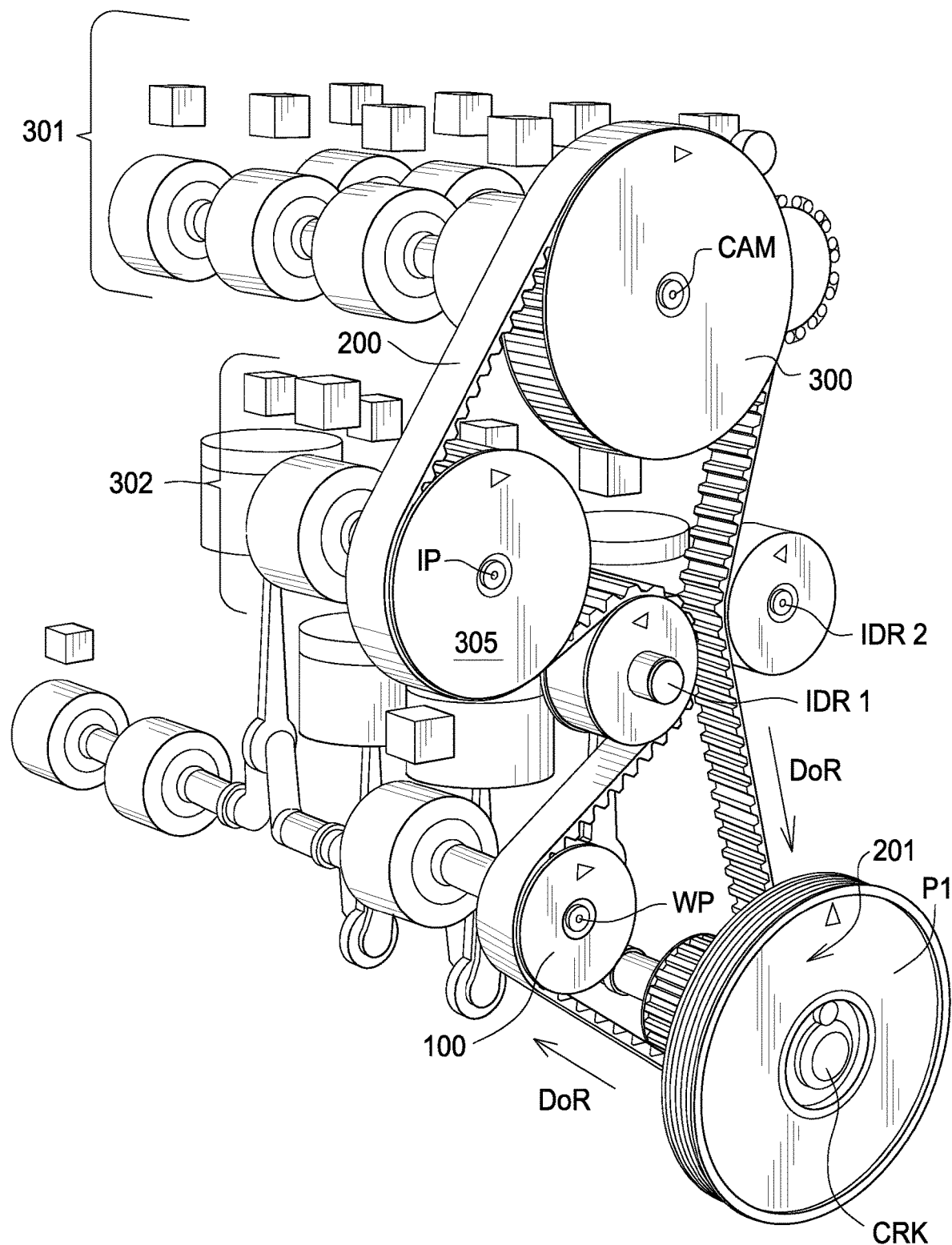
FIG. 5 is a perspective view of a single cam, four-cylinder, four-stroke, diesel driven engine with the fuel pump incorporated in the synchronous belt drive system.

FIGS. 3, 4 and 5 are some typical drive layouts for four-cylinder, four-stroke, internal combustion engines using a toothed belt system to drive the camshaft and auxiliaries. These engines typically exhibit a high $2^{nd}$ order dynamic. Dependent upon fuel pump specification, some diesel engines may have a $1.5^{th}$ order which is dominant. Schematic diagrams showing such dynamics can be seen in FIGS. 7, 8 and 9.

In order to counteract $2^{nd}$ order dynamics, the inventive sprocket 10 is attached to the engine crankshaft CRK. Dependent on the presence of other dominant orders, it may be necessary to apply alternative embodiments of the sprocket. These may be attached to the crankshaft, but may equally be applied elsewhere in the system, for example on the water pump, fuel pump or on the camshaft sprocket(s). The engine crankshaft is the driver for the entire belt drive system. The driven direction of the belt is DoR. Due to the sprocket ratio, the engine crankshaft CRK rotates twice for each rotation of the camshaft CAM1.

In FIG. 3, sprocket 300 is connected to the camshaft CAM1 and sprocket 304 is connected to a second camshaft CAM2. Idlers IDR1 and IDR2 known in the art are used to maintain proper belt routing and tension control. Sprocket 100 is connected to the water pump WP. Belt 200 is trained among the several sprockets. The direction of rotation for belt 200 is shown as DoR. The point at which belt 200 engages crankshaft sprocket CRK is 201. The camshaft inertia and torque loads are represented by 301.

Toothed belt 200 is trained between sprocket 10 and cam sprocket 300. The belt entry point 201 is that point at which the belt 200 engages the sprocket. The belt span length between the crankshaft CRK and the cam sprocket 304 is "SL".

Similarly in FIGS. 4 and 5, camshaft sprocket 300 is attached to the engine camshaft CAM. In FIG. 4, the load characteristic 301 includes the torque characteristic of a fuel pump attached to the rear of the camshaft whereas in FIG. 5, the fuel pump torque is represented by load characteristic 302. Inertias and torque loads (301, 302, 101) caused by other components such as water and vacuum pumps may also be present as well, namely, WP (100) in FIG. 4 and FIG. 5. In FIG. 4 IDR1 and IDR2 are idlers known in the art to properly guide belt 200. In FIG. 4, the belt span length between the crankshaft sprocket 10 and the cam sprocket 300 is "SL".

For a gasoline engine the dominant cyclic fluctuating torque loads are normally a characteristic of the camshaft. For a diesel engine the dominant order can be produced by the camshaft and/or a fuel injection pump which may be included in the drive system. The torques caused by the water pump and vacuum pump may vary but they are not cyclic, within their own right, on the same period or frequency as the camshafts and are not normally dominant characteristics of the drive dynamics.

FIG. 5 is a perspective view of another single cam engine embodiment with fuel injection pump included in the drive for a diesel engine. In this embodiment, in addition to the system shown in FIG. 4 the system further comprises sprocket 305 connected to the fuel pump IP. Also shown is sprocket P1 which is engageable with another multi-rubbed belt used to drive various engine accessories (not shown). In FIG. 5 the cam loads are depicted by 301 and the fuel pump load by 302. Sprocket 100 is connected to the water pump WP. In FIG. 5 the torque load caused by a fuel injection pump is represented by 302.

Figure 7:
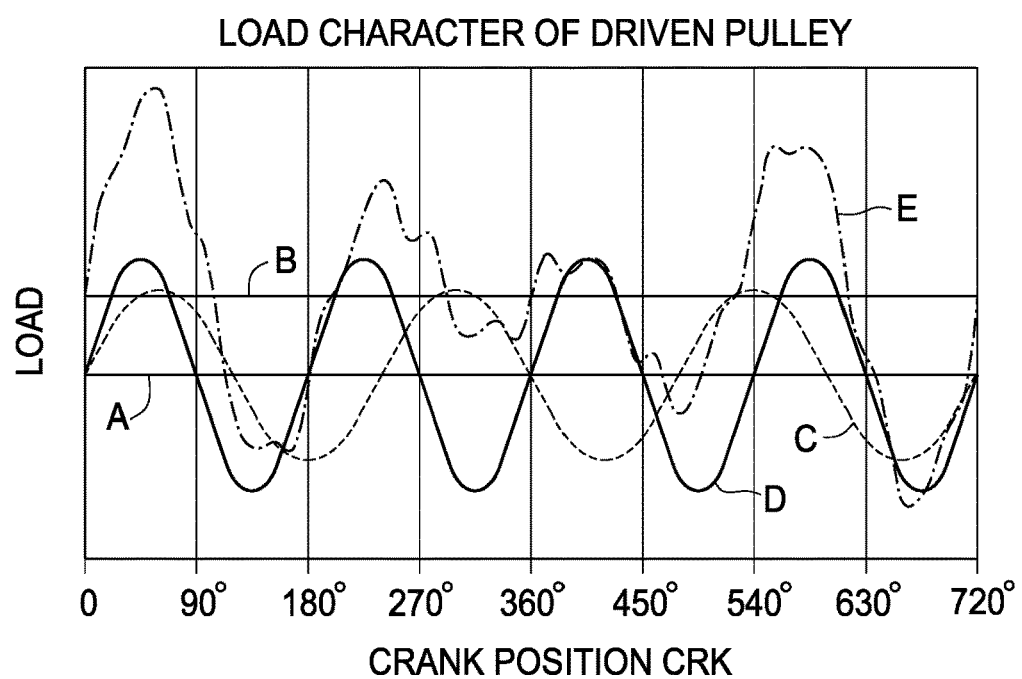
FIG. 7 is representative of a typical total load characteristic for the driven sprocket of a four-cylinder, four-stroke, diesel engine, including extracted curves for the $1.5^{th}$ and $2^{nd}$ orders.

A typical total load characteristic for a four-cylinder, four-stroke engine is represented by curve "E" in FIG. 7. Curves "D" and "C" represent typical $2^{nd}$ and $1.5^{th}$ order characteristics which have been extracted from the total load characteristic. The load characteristic of an in-line four-cylinder, four-stroke, gasoline driven engine would not normally include a $1.5^{th}$ order.

Figure 8:
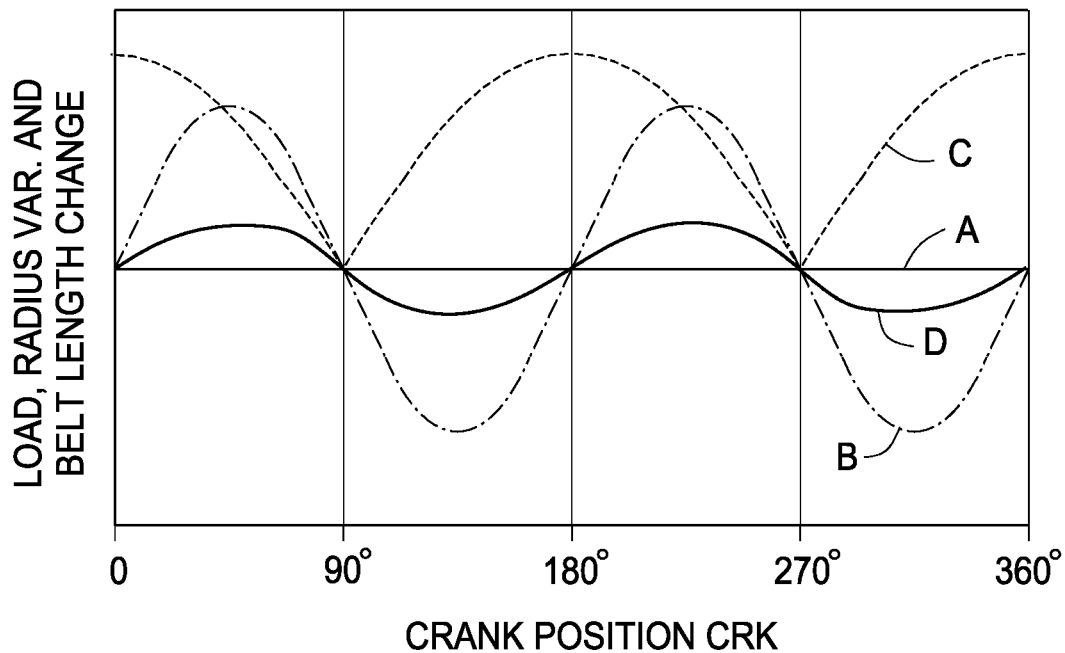
FIG. 8 is representative of the $2^{nd}$ order load characteristic for a driver sprocket of a four-cylinder, four-stroke engine.

The change in average radius at belt engagement point 201 of the inventive sprocket 10 as it rotates is curve "C" in FIGS. 8 and 9. The integral of curve "C", which is the effective length change of the belt in FIG. 4, is curve "D" on FIGS. 8 and 9. The derivative of the change in average sprocket radius is the acceleration of a given point on the toothed surface, 11, due to the change in sprocket shape.

In order to counteract $2^{nd}$ order dynamics, the flat portion 16 of the obround sprocket 10 is arranged in timing relation to the camshaft sprocket 300 such that an effective length of the belt 200 between sprocket 300 and sprocket 10 in FIG. 4 is made to vary in a manner that substantially cancels the alternating belt tensions caused by the cyclic camshaft torque fluctuations. As an example of a design to cancel $2^{nd}$ order dynamics, this can be achieved by timing the maximum length of sprocket 10 (R1+R2+W) to coincide with the belt entry point 201 when the camshaft torque, and therefore belt tension, is at a maximum.

The absolute dimensional characteristic of a drive containing an obround sprocket is dependent on parameters such as the fluctuating torque, the belt span modulus, the inertias of each of the driven accessories in the system, the belt installation tension and the interaction between the belt and sprockets. The interaction between the belt and sprockets is dependent on parameters such as the number of teeth in mesh on the sprocket, the belt tooth modulus, the belt dimensions and the coefficient of friction between the belt and sprocket surfaces.

Figure 6:
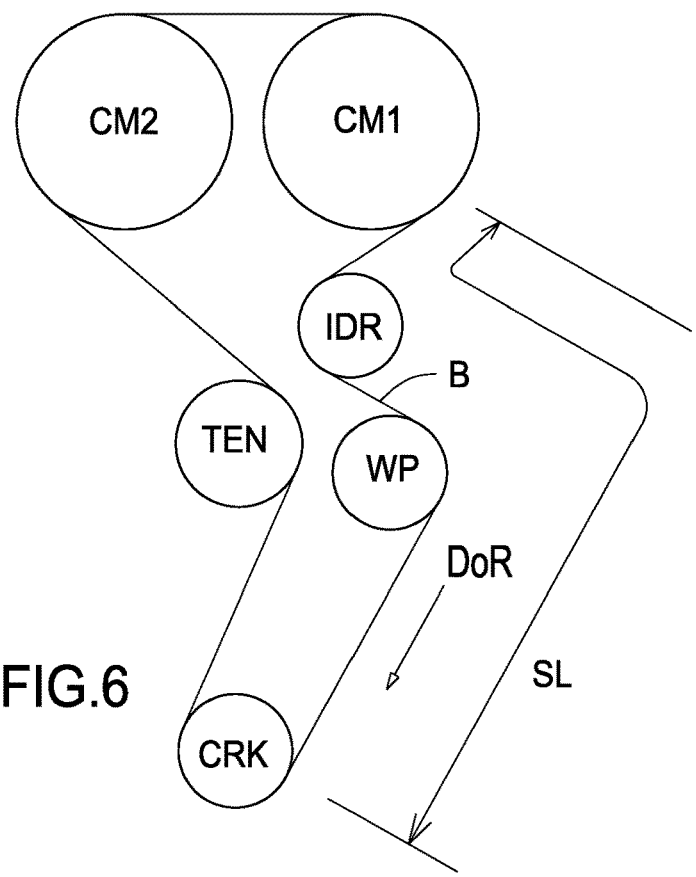
FIG. 6 is a schematic of a twin cam, four-cylinder, four-stroke, gasoline driven engine.

FIG. 6 is a schematic of a twin cam, four-cylinder, four-stroke, gasoline engine. The illustrative system comprises cams CM1, CM2, and belt B trained there between. It further comprises tensioner TEN, water pump WP, and crankshaft sprocket CRK. The direction of rotation of belt B is DoR. The span lengths of interest are between sprocket CRK and sprocket IDR, sprocket IDR and sprocket WP and sprocket CRK and sprocket WP. In FIG. 6, the belt span length between the crankshaft sprocket CRK and the cam sprocket CM1 is "SL". For calculation purposes since there is no major load impact between CM1 and CRK in DoR, these may be treated as one span "SL". Approximate typical values for the variables for the system described in FIG. 6 are as follows:

Typical Cam Torque fluctuations are: +40N/−30N
Belt Span Modulus: 240 MPa
Typical component inertia values are:
CRK=0.4 gm$^2$
CM1=CM2=1.02 gm$^2$
WP=0.15 gm$^2$
Belt Installation Tension: 400 N (The installation tension is maintained by the tensioner TEN preferably using the tensioner described herein).

Teeth in mesh on three sprockets: CRK ⇒9 teeth; CM1, CM2 ⇒15 teeth.
Belt dimensions: width=25.4 mm; length=1257.3 mm.
Typical values for the coefficient of friction for the sprocket surface 11 are in a range from 0.15 and 0.5, typically 0.2.
Typical belt installation tension values can be in the range of 75 N up to 900 N depending upon system requirements.
The belt span modulus is dependent on the tensile member construction, the number of strands of the tensile member within the belt and the belt width. An example of belt span modulus for a 25.4-mm wide belt having twenty fiberglass tensile members could be in the region of approximately 240 MPa.

FIG. 7 is representative of a typical total load characteristic for the driven sprocket of a four-cylinder, four-stroke, diesel engine, including extracted curves for the $1.5^{th}$ (curve "C") and $2^{nd}$ (curve "D") orders. The load characteristic of an in-line four-cylinder, four-stroke, gasoline driven engine would not normally include a $1.5^{th}$ order. The "Offset" refers to W/2. The "Total Load" refers to FIG. 7, line "E".

In FIG. 7, Line "A" is zero torque. Line "B" depicts the average torque in the belt drive system. Curve "C" is the $1.5^{th}$ order torque characteristic extracted from the total load curve "E". Curve "D" is the $2^{nd}$ order torque characteristic extracted from the total load curve "E". Curve "E" is the total torque characteristic of the engine measured at the crankshaft CRK. The area under curve "E" represents the work done to turn the engine at a particular speed.

FIG. 8 is representative of the $2^{nd}$ order load characteristic (curve "B") for a driver sprocket of a four-cylinder, four-stroke engine including the change in radius (curve "C") for an obround sprocket and the resultant belt span length change (curve "D").

In FIG. 8, line "A" is zero torque. Curve "B" is the $2^{nd}$ order torque characteristic extracted from the total load. Curve "C" is the variation in effective crankshaft pulley radius as it rotates through 360 degrees caused by segment 16 in FIG. 1. Curve "D" is the integral of curve "C" and is the effective change in belt drive span length caused by the sprocket described in FIG. 1.

FIG. 9 is representative of the $1.5^{th}$ order load characteristic "B" for a driver sprocket of a four-cylinder, four-stroke, diesel engine with a three piston fuel pump, (or other driven device that will induce a $1.5^{th}$ order), including the change in sprocket radius length (curve "C") for an alternative three lobe embodiment of the obround sprocket (FIG. 2) and the resultant belt span length change (curve "D"). Belt span length is the distance between the cam sprocket CAM and crankshaft sprocket CRK on FIG. 6 for example.

In FIG. 9, line "A" is zero torque. Curve "B" is the $1.5^{th}$ order torque characteristic extracted from the total load. Curve "C" is the variation in effective crankshaft pulley radius as it rotates through 360 degrees. Curve "D" is the integral of curve "C" and is the effective change in drive length caused by the alternate embodiment of the sprocket described in FIG. 3.

Figure 10:
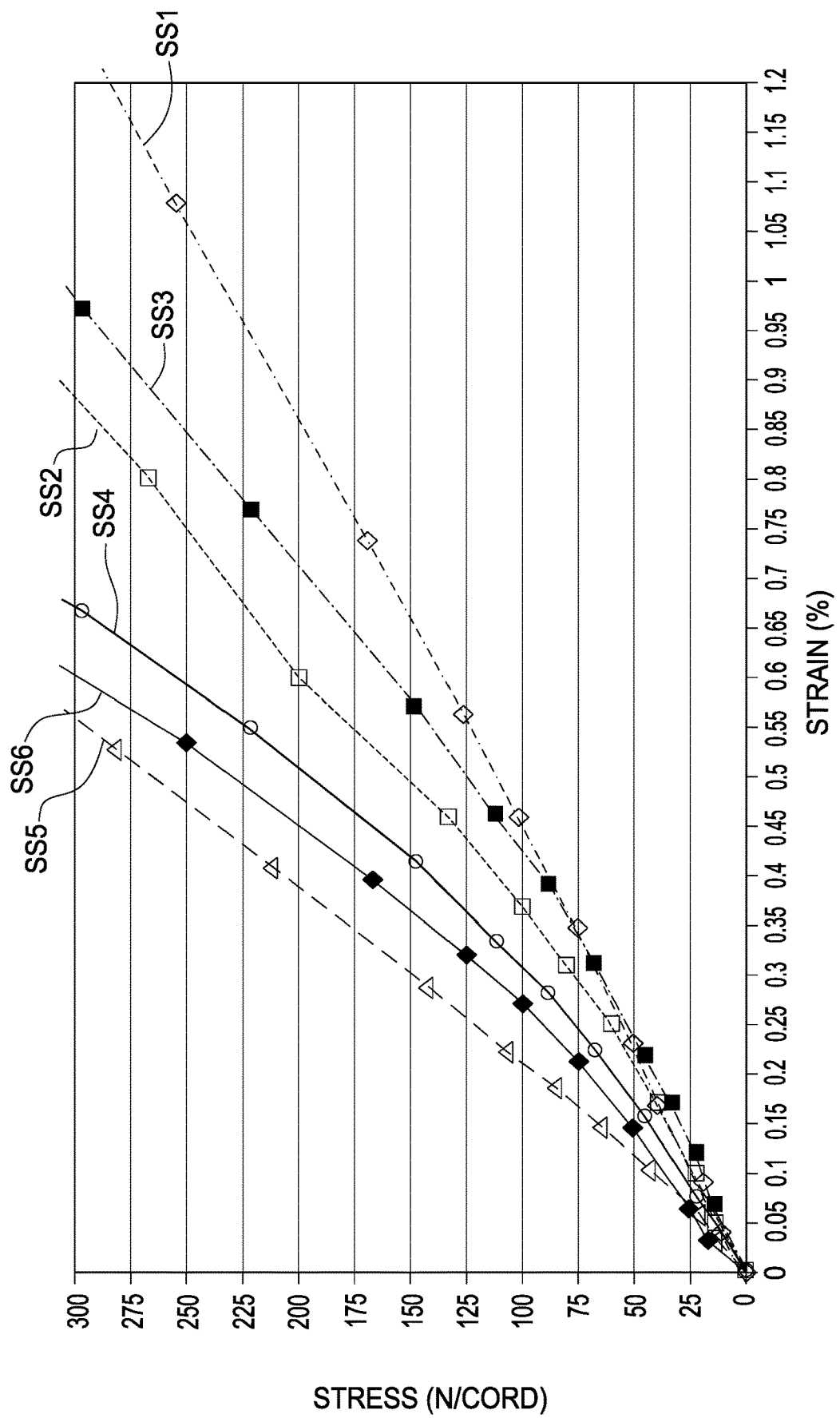
FIG. 10 is a family of curves representing stress/strain relationships for a synchronous belt.

The elastic modulus of a tensile member of a variety of belts used in the inventive system is shown in FIG. 10. The curves SS1 thru SS6 are known as stress-strain curves for a variety of belts 200. Each curve represents a modulus using a different material for the tensile cord in the belt. The elastomeric HNBR belt body is illustrative and not limiting. In addition to HNBR, other belt body materials can include EPDM, CR (polychloroprene) and polyurethane, or a combination of two or more of the foregoing. The materials comprise for:

SS1 (fiberglass #1 tensile cord, HNBR body)
SS2 (fiberglass #2 tensile cord, HNBR body)
SS3 (fiberglass #3 tensile cord, HNBR body)
SS4 (carbon fiber tensile cord, HNBR body)
SS5 (aramid tensile cord, HNBR body)
SS6 (carbon fiber tensile cord, HNBR body).

The elastic modulus, M, of each tensile member is the slope of each curve SS1 thru SS6, as is known in the art. Typically this measurement and calculation is taken on the substantially linear portion of the curve. In addition to fiberglass, carbon fiber, and aramid, another tensile member material may include fine filament stainless steel wire or PBO.

$$M = \Delta\text{stress}/\Delta\text{strain (as measured in the substantially linear portion of the curve).}$$

The belt span modulus is dependent on the tensile member construction, the number of strands of the tensile member within the belt and the belt width. An example of belt span modulus for curve SS1, for a 25.4-mm wide belt with twenty strands of fiberglass tensile member, would be approximately 242 MPa.

Figure 11:
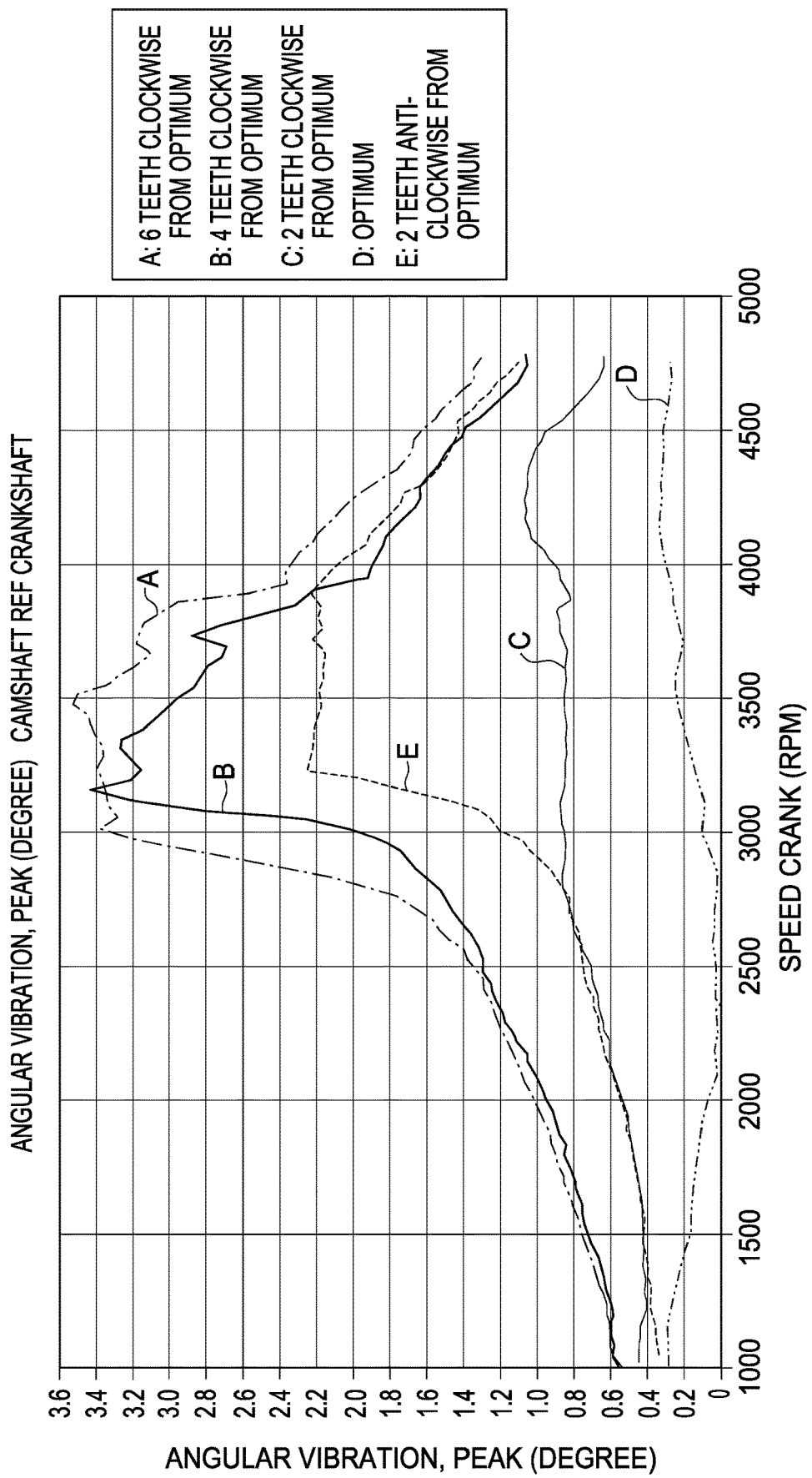
FIG. 11 is a series of curves showing the effects of the phasing/misphasing of an obround sprocket on the engine dynamic for the system in FIG. 6.

FIG. 11 is a series of curves showing the effects of the phasing/misphasing of an obround sprocket major length on the engine dynamic for the system in FIG. 6. Curve "D" is the optimum timing arrangement between the position of the sprocket major length to belt entry point 201 and torque pulse. Curves A, B, and C are mistimed clockwise from the curve "D" position by +6, +4, and +2 teeth respectively. Curve "E" is mistimed by 2 teeth in an anticlockwise direction. Phasing of maximum belt span length to peak torque and inertial load may vary dependent on the dominant orders of the drive and those which are to be diminished by the system. The belt entry point 201 is that point at which the belt engages the sprocket. In FIG. 3 the span length is "SL".

Regarding angular interval or phasing the allowable angular tolerance is calculated using the following:

$$\pm(360/2 \times \text{number of sprocket grooves}).$$

The belt drive span length is at a maximum when the torque is at a maximum.

Figure 12:
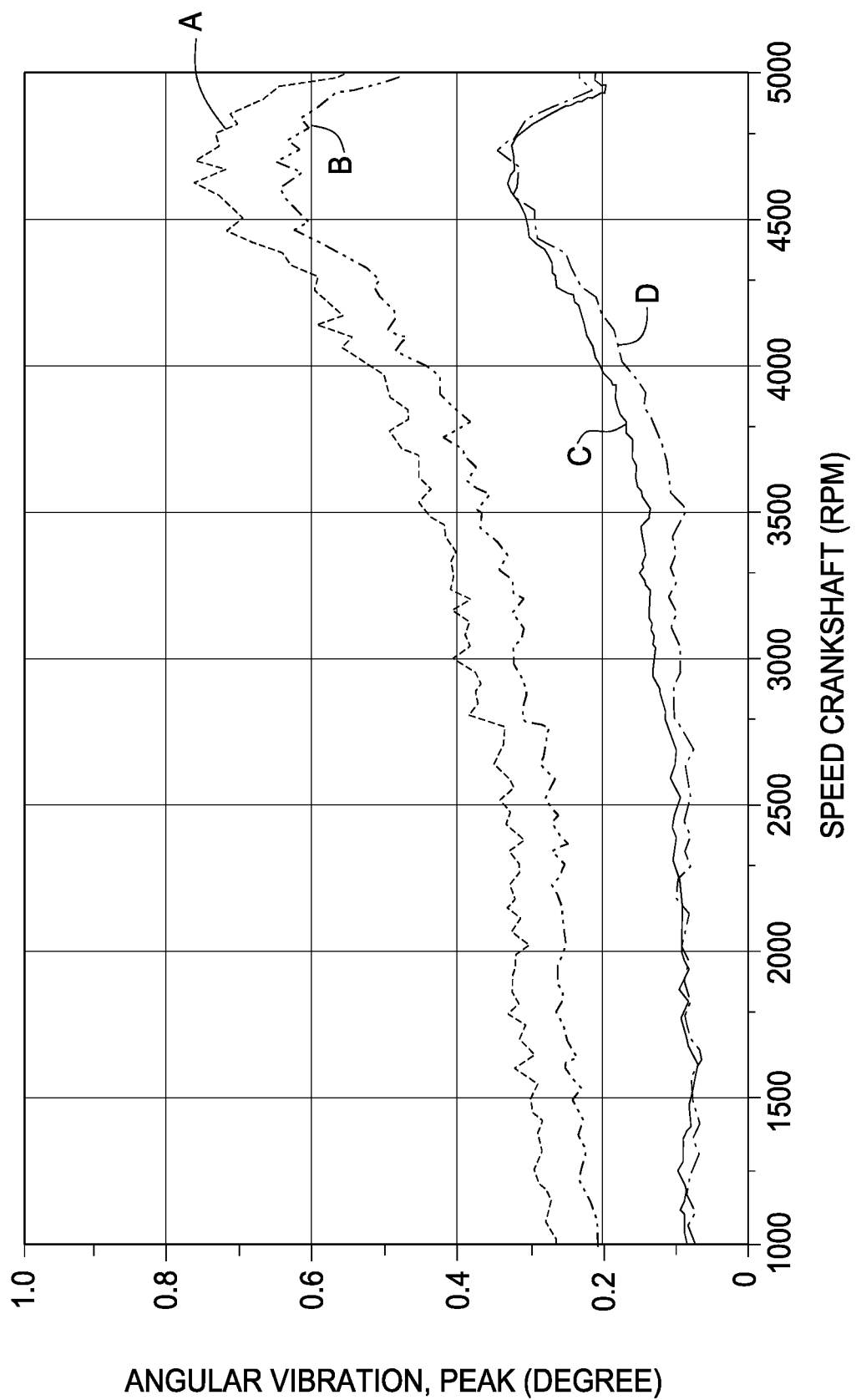
FIG. 12 is a chart showing the Angular Vibration characteristic at the camshaft of an engine shown in FIG. 6 before and after application of an obround sprocket.

FIG. 12 is a chart showing the effect of a correctly phased obround sprocket on a twin cam, four-cylinder, four-stroke engine as depicted in FIG. 6. Curves "A" and "B" represent measured values for angular vibration at the inlet and exhaust camshaft sprockets respectively for a prior art design using round sprockets.

By way of comparison, curves "C" and "D" represent measured values for angular vibration at the inlet and exhaust camshaft sprockets respectively with an inventive sprocket used on the crankshaft. The resultant reduction in angular vibration is approximately 50%.

Figure 13:
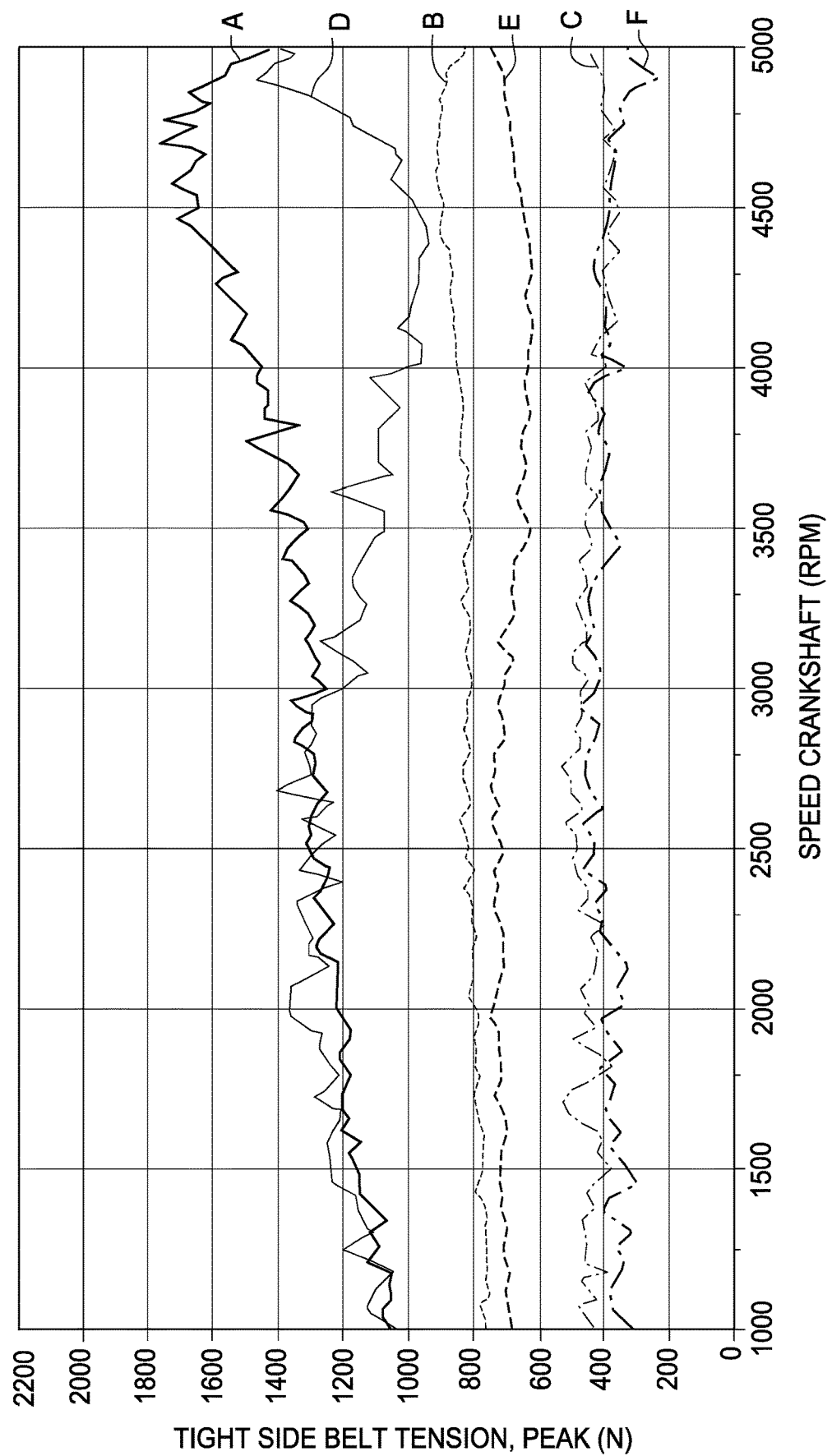
FIG. 13 is a chart showing the Tight Side Tension characteristic of an engine shown in FIG. 6 before and after application of an obround sprocket.

Similarly, FIG. 13 is a chart showing the effect of a correctly phased obround sprocket as described in FIG. 1 on a twin-cam, four-cylinder, four-stroke engine as depicted in FIG. 6. Curves "A", "B" and "C" represent measured values for maximum, average and minimum dynamic tight side tensions respectively over a range of engine speeds for a prior art drive design. In this example, this tension was measured at position IDR in FIG. 6. For extended belt lifetime the belt tight side tension should be minimized. Curves "D", "E" and "F" represent measured values for maximum, average and minimum belt tight side tensions with the inventive sprocket in use. The resultant reduction in installation tight side tension is in the range of 50-60% in the resonant speed range of the engine (approximately 4000 rpm to approximately 4800 rpm). The decrease in belt tight side tension gives potential for significant improvement in the belt operating lifespan.

The inventive system is useful to reduce timing error in IC engines. Timing error is the positional discrepancy between a driver and a driven shaft caused by random factors such as vibration, component inaccuracy and elastic deformation. In this case, it is the rotational inaccuracy of the camshafts (driven) of an IC engine in comparison to the crankshaft (driver) of the engine. It is normally reported in degrees peak-to-peak ("pk to pk"). For example, referring to FIG. 3, sprocket 300 and sprocket 304 are each obround. Use of the obround sprockets significantly reduces timing error which in turn gives improvement in fuel economy, lowers emissions and generally improves engine performance and efficiency. At a component level, reduced timing error and lower system loads lead to better durability and less potential for NVH issues. Reduction of tension reduces NVH levels, and especially meshing order, in the drive. The application of obround sprocket to reduce timing error is not limited only to the camshafts of an engine. The benefit can equally be obtained by inserting the obround sprocket on crank or fuel pump.

Figure 14:
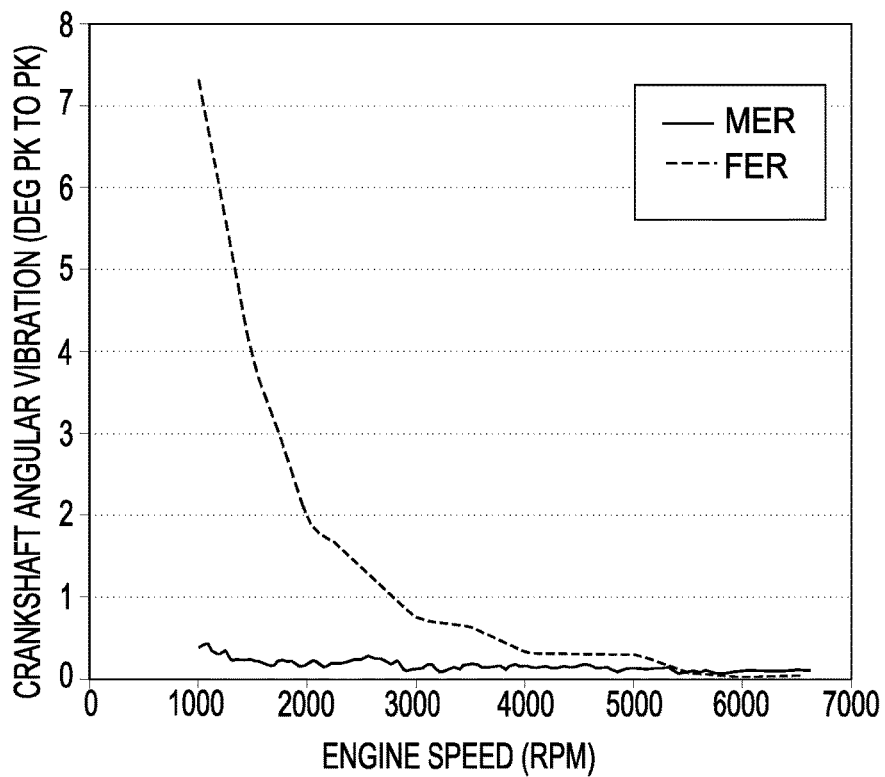
FIG. 14 is a chart of vibration angle versus crankshaft rotation speed.

FIG. 14 is a chart of angular vibration versus crankshaft rotation speed. The exemplary angular vibration diminishes as engine speed increases. FIG. 14 displays data for a motored-engine test rig and a firing-engine test rig. For a motored engine the crankshaft is driven by an electric motor, there is no fuel combustion in each cylinder. For a firing engine the crankshaft is driven in the normal manner for an internal combustion engine, i.e., with combustion of fuel in each cylinder. The motored engine rig (MER) reflects less angular vibration than the firing engine rig (FER) for a given engine rotational speed.

Figure 15:
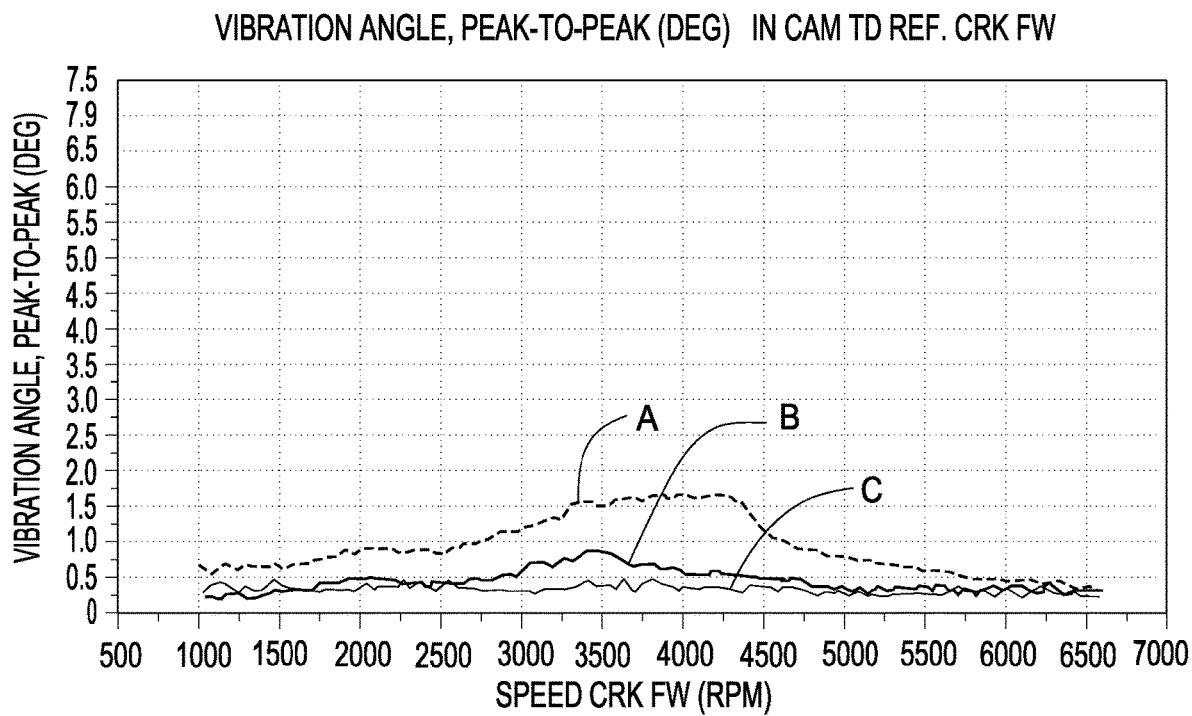
FIG. 15 is a chart of vibration angle versus crankshaft speed for an inlet cam.

FIG. 15 is a chart of vibration angle versus crankshaft speed for an inlet cam. An obround sprocket is mounted to the inlet valvetrain camshaft. Three conditions are shown. The first is for a standard drive system with no obround sprocket (Curve A). The second is with an obround sprocket (curve B) and the third is with an obround sprocket and a high modulus belt (Curve C). The phase and magnitude of the obround sprocket is 10.5 pitches from 3 o'clock position and 1.5 mm. The standard belt modulus is 630,000 N and the high modulus belt modulus is 902,000 N. The modulus is given in Newtons (N) and is defined as the force required to extend a unit length by 100%.

The vibration angle for the third condition (Curve C) is significantly reduced to less than 0.5 deg peak-to-peak when compared to the value for the standard drive system at about 1.5 deg peak-to-peak, both measured at 4000 RPM.

Figure 16:
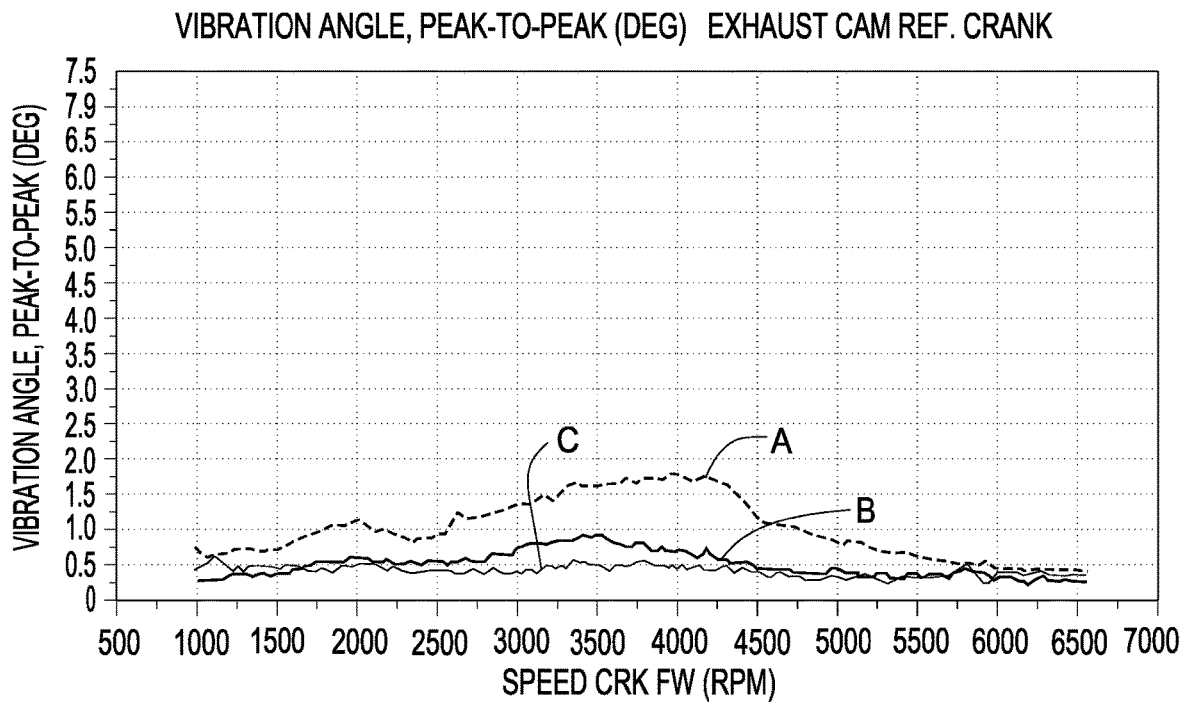
FIG. 16 is a chart of vibration angle versus crankshaft speed for an exhaust cam.

FIG. 16 is a chart of crankshaft speed versus vibration angle for an exhaust cam. An obround sprocket is mounted to the exhaust valvetrain camshaft. Three conditions are shown. The first is for a standard drive system with no obround sprocket (Curve A). The second is with an obround sprocket and the third is with an obround sprocket and a high modulus belt (Curve B). The vibration angle for the third condition is significantly reduced to about 0.5 deg peak-to-peak when compared to the value for the standard drive system at about 1.5 deg peak-to-peak, both measured at 4000 RPM (Curve C). However, depending on the engine the improvement can range from under 1.5 deg peak-to-peak to about 0.5 deg, a reduction of just over 60%. The phase and magnitude of the obround sprocket is 23.5 pitches from 3 o'clock position and 1.5 mm. The standard belt modulus is about 630,000 N and the high modulus belt modulus is about 902,000 N.

Figure 17:
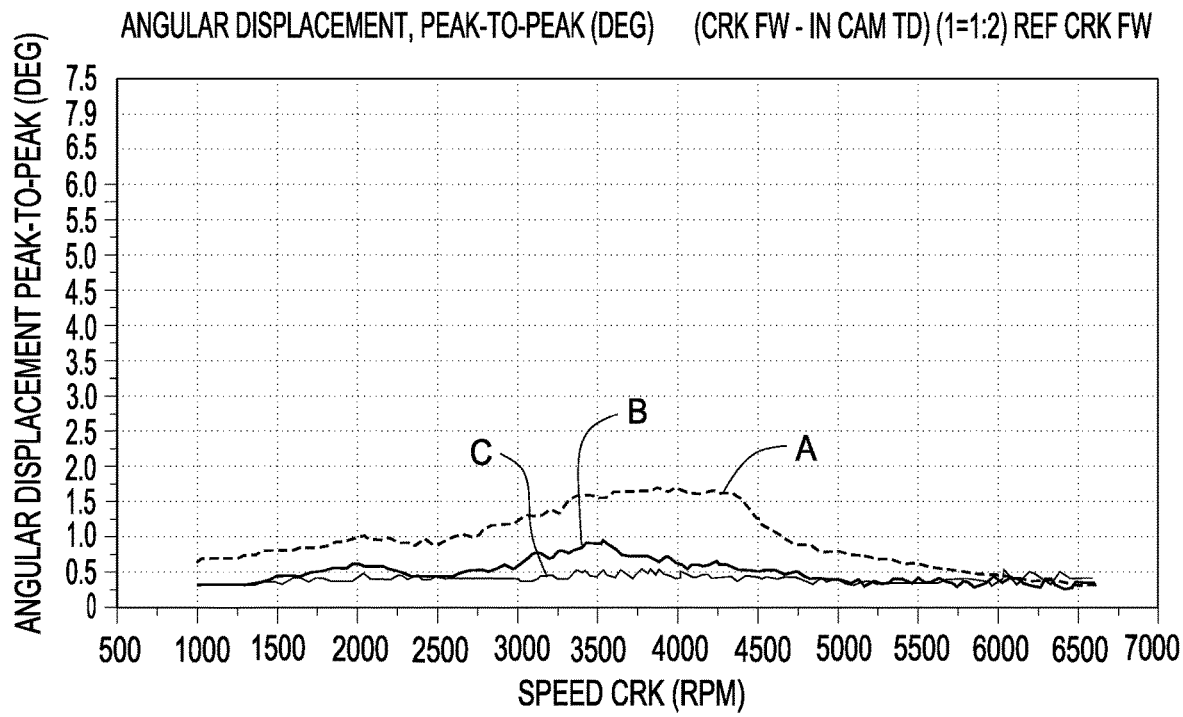
FIG. 17 is a chart of angular displacement versus crankshaft speed for an inlet cam.

FIG. 17 is a chart of crankshaft speed versus angular displacement for an inlet cam. Angular displacement is also referred to as timing error and is measured relative to crankshaft position. An obround sprocket is mounted to the inlet valvetrain camshaft. Three conditions are shown. The first is for a standard drive system with no obround sprocket (Curve A). The second is with an obround sprocket and the third is with an obround sprocket (Curve B) and a high modulus belt (Curve C). The angular displacement for the third condition is significantly reduced to less than 0.5 deg peak-to-peak when compared to the value for the standard drive system at about 1.5 deg peak-to-peak, both measured at 4000 RPM (Curve C). However, depending on the engine the improvement can range from under 1.5 deg peak-to-peak to about 0.5 deg, a reduction of just over 60%. The phase and magnitude of the obround sprocket is 10.5 pitches from the 3 o'clock position and 1.5 mm. The standard belt modulus is about 630,000 N and the high modulus belt modulus is about 902,000 N.

Figure 18:
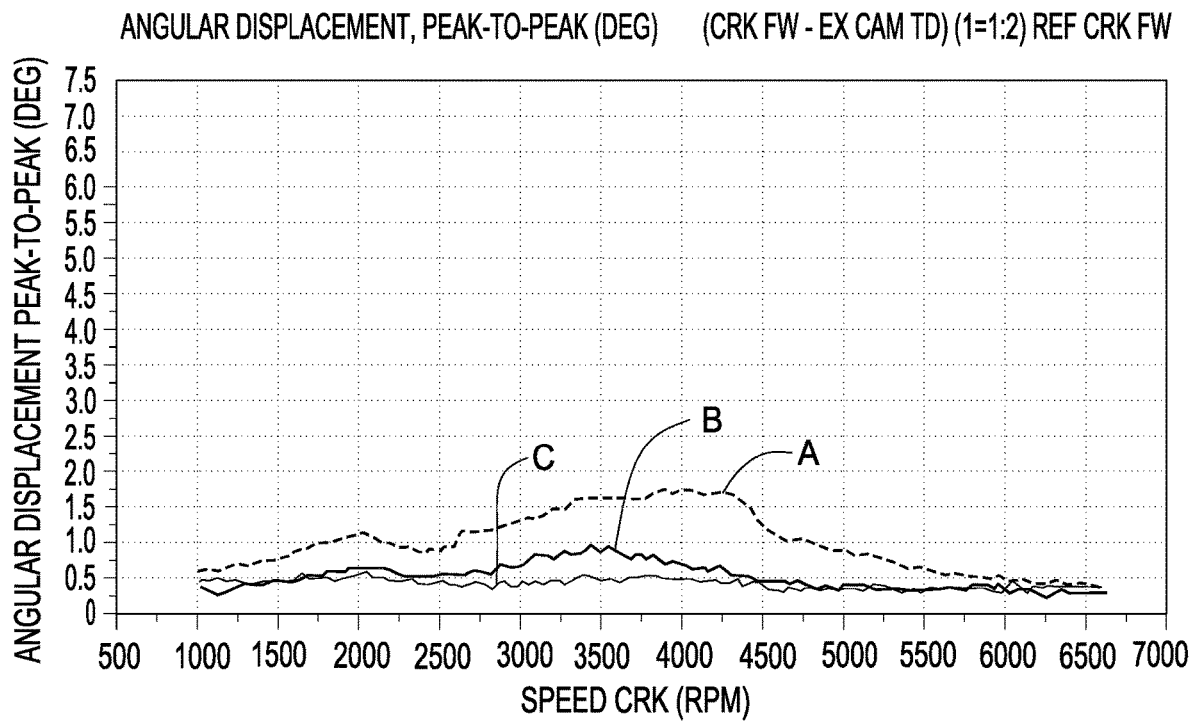
FIG. 18 is a chart of angular displacement versus crankshaft speed for an exhaust cam.

FIG. 18 is a chart of crankshaft speed versus angular displacement for an exhaust cam. An obround sprocket is mounted to the exhaust valvetrain camshaft. Three conditions are shown. The first is for a standard drive system with no obround sprocket (Curve A). The second is with an obround sprocket (Curve B) and the third is with an obround sprocket and a high modulus belt (Curve C). The angular displacement for the third condition is significantly reduced to about 0.5 deg peak-to-peak when compared to the value for the standard drive system at about 1.5 deg peak-to-peak, both measured at 4000 RPM. However, depending on the engine the improvement can range from under 1.5 deg peak-to-peak to about 0.5 deg, a reduction of just over 60%. The phase and magnitude of the obround sprocket is 23.5 pitches from the 3 o'clock position and 1.5 mm. The standard belt modulus is about 630,000 N and the high modulus belt modulus is about 902,000 N.

Figure 19:
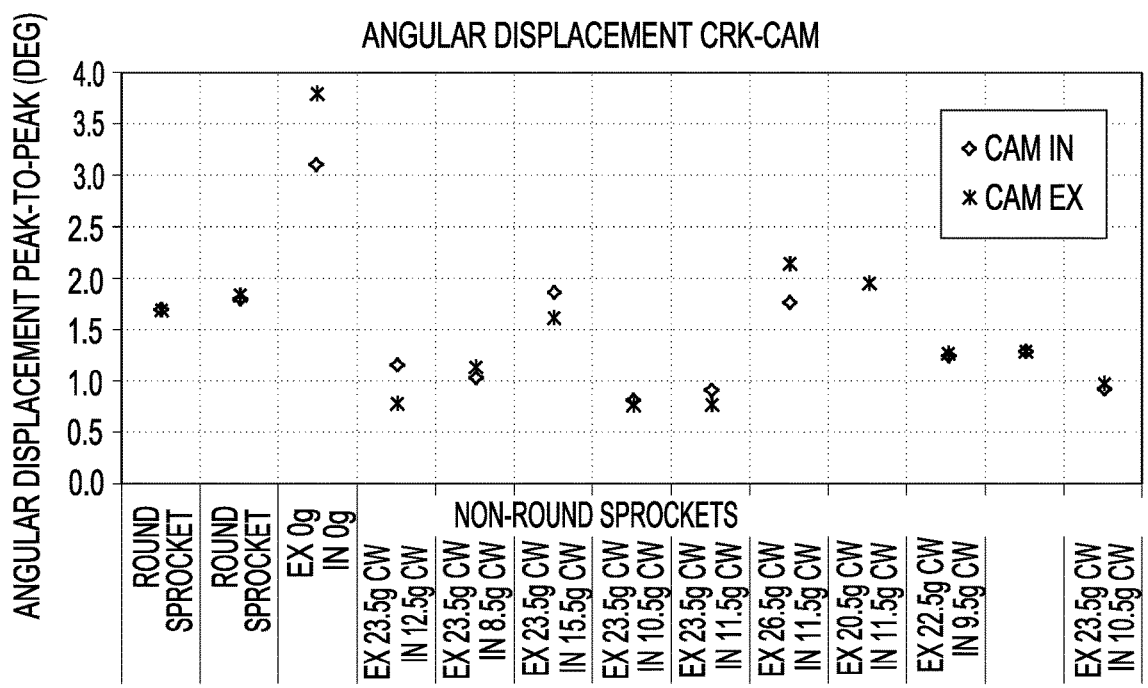
FIG. 19 is a diagram showing the effect of the obround sprocket phasing relative to each camshaft timing error.

FIG. 19 is a diagram showing the effect of the obround sprocket phasing relative to each camshaft timing error. The Y axis is angular displacement, or timing error, of each cam sprocket with reference to the crankshaft. It is quoted as a peak-to-peak value, that is, the numerical difference between min and max. Columns 1 and 2 of the diagram report a standard drive set up using all round sprockets. Column 3 reports use of a $3^{rd}$ order obround sprocket installed on the inlet and the exhaust camshaft. Each sprocket is positioned such that max offset is in line with the cam shaft lobes. Columns 4 to 13 report various trials using differing offsets of the obround sprockets. The "3 o'clock" position is the datum for all angular offsets. The values given are simply the number of pitches, or grooves "g", through which the sprocket datum point was rotated from that position. "Datum point" is the point used as reference for angular measurements. This is set at the 3 o'clock position. "cw" refers to clockwise. For example, "Ex 23.5 g cw" refers to the 3 o'clock position and the exhaust cam obround sprocket having an offset of 23.5 grooves in the clockwise direction from the 3 o'clock position on the engine.

Figure 20:
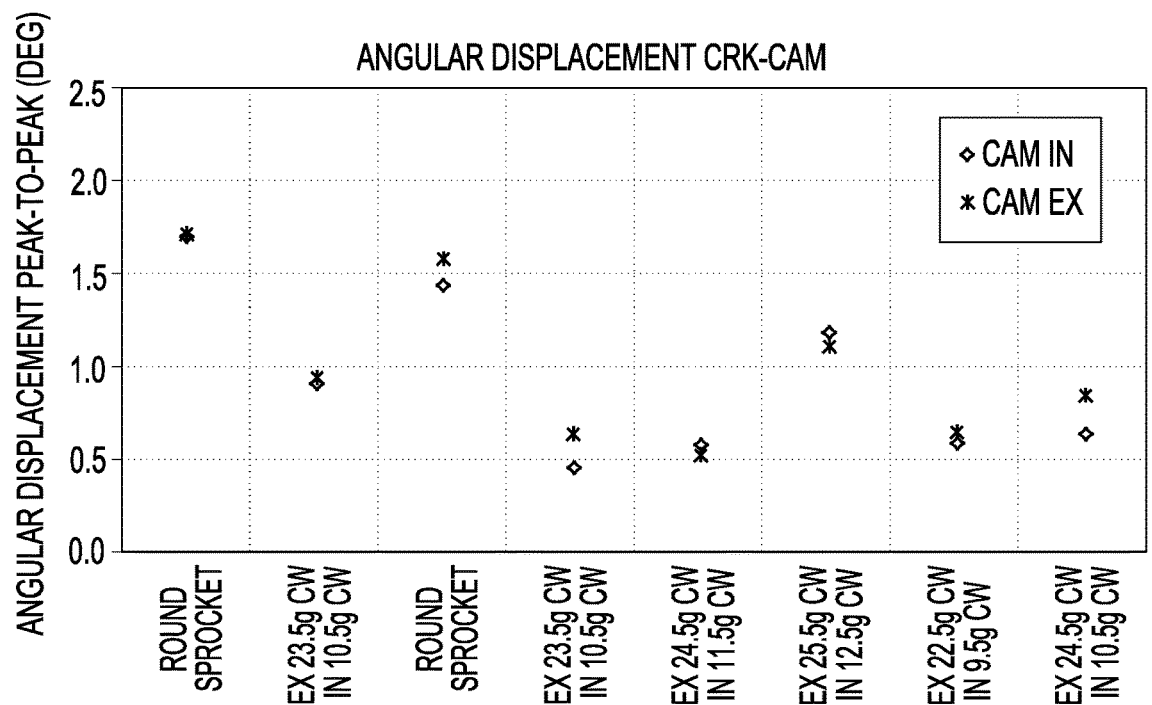
FIG. 20 is a diagram showing the effect of the obround sprocket phasing relative to each camshaft timing error with a standard and high modulus belt.

FIG. 20 is a diagram showing the effect of the obround sprocket phasing relative to each camshaft timing error with a standard and high modulus belt. The Y axis is angular displacement in degrees peak-to-peak, or timing error, of each cam sprocket with reference to the crankshaft. It is quoted as a peak-to-peak value, that is, the numerical difference between min and max. Columns 1 and 3 of the diagram report a standard drive set up using all round sprockets. Each column reports use of a $3^1$ order obround sprocket installed on the inlet and the exhaust camshaft. Each sprocket is positioned such that max offset is in line with the cam shaft lobes. Columns 2 and 4 to 8 report various trials using differing offsets of the obround sprockets. The "3 o'clock" position is the datum for all offsets. The values given are simply the number of pitches, or grooves, through which the sprocket datum point was rotated from that position. "Datum point" is the point used as reference for angular measurements. This is set at the 3 o'clock position. The phase and magnitude of the obround sprocket is 23.5 pitches for the exhaust and 10.5 pitches for the inlet from the 3 o'clock position and 1.5 mm for each. The standard belt modulus is about 630,000 N and the high modulus belt modulus is about 902,000 N.

Figure 21:
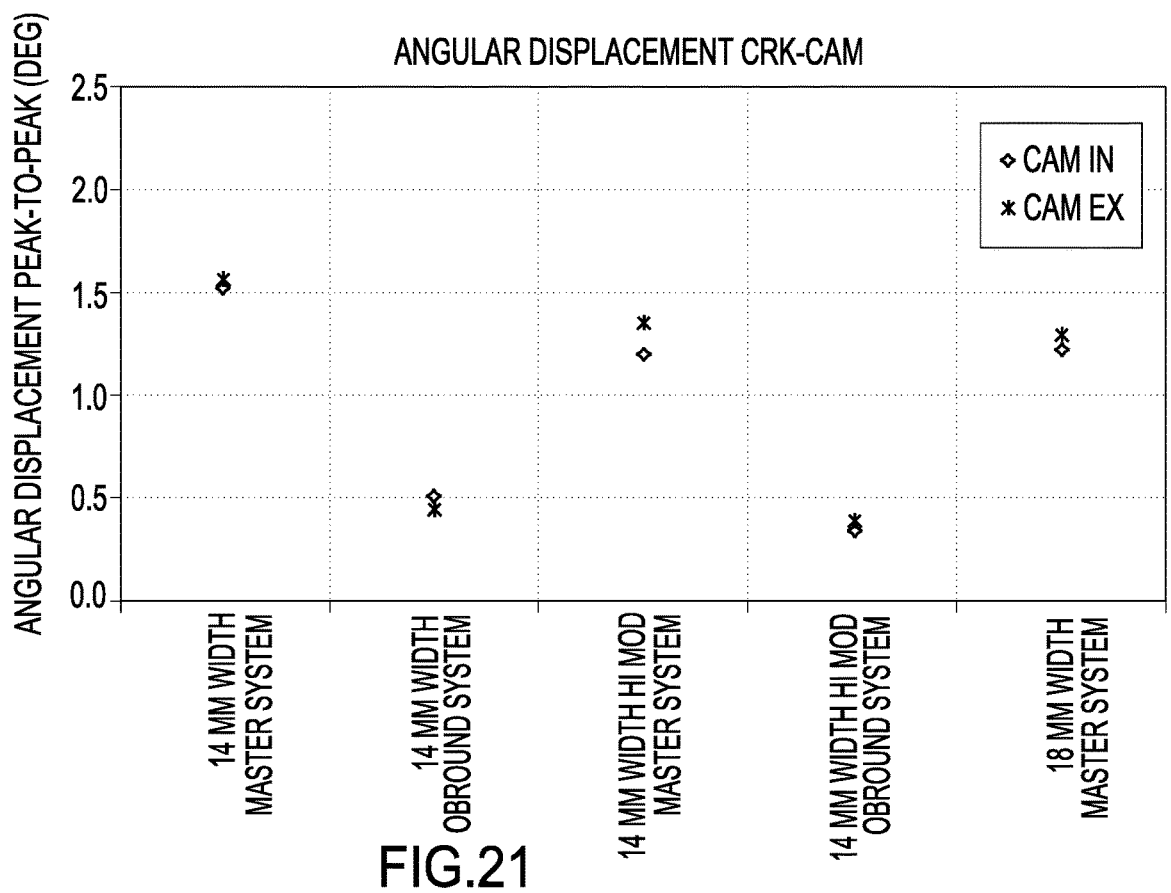
FIG. 21 is a diagram showing the effect of an obround sprocket on timing error by belt width.

FIG. 21 is a diagram showing the effect of an obround sprocket on timing error by belt width. Column 1 reports a 14-mm wide belt in a system using round sprockets. Column 2 reports a 14-mm wide belt in a system using obround sprockets. Column 3 reports a 14-mm wide belt using a high-modulus belt in a system using standard sprockets. Column 4 reports 14-mm wide belt using a high-modulus belt in a system using obround sprockets. Column 5 reports an 18-mm wide belt using a standard-modulus belt in a system using standard sprockets.

Figure 22:
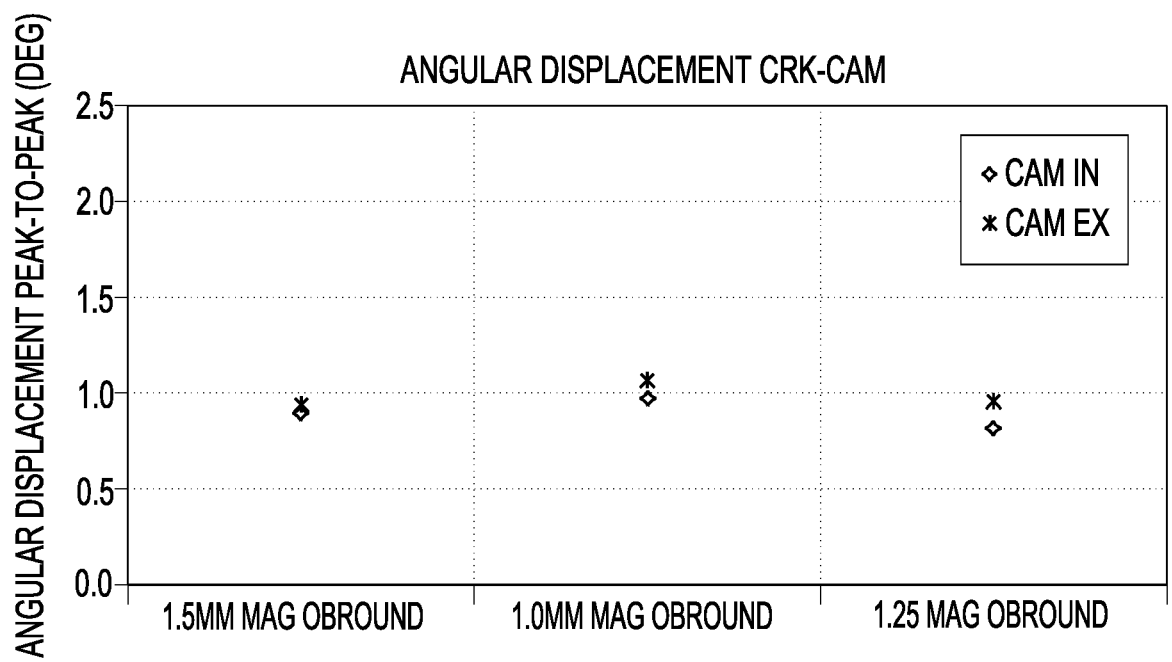
FIG. 22 is diagram showing the effect of an obround sprocket in timing error by magnitude of eccentricity.

FIG. 22 is diagram showing the effect of an obround sprocket in timing error by magnitude of eccentricity. Each column reports an obround sprocket used on the inlet and outlet camshafts. The magnitude of eccentricity for each system ranges from 1.0 mm to 1.5 mm.

Testing to validate the effectiveness of the obround sprocket to reduce belt drive system dynamics can be carried out on both motored and firing engines. The results for timing error improvement included in the figures were generated on a motored engine. While in most cases these results transfer to a firing engine, in some cases obround sprockets do not reduce dynamics on certain engines. Testing should be performed on a firing engine to assure the required improvements are achieved and are reliable. The steps necessary to conduct the testing are known in the engine dynamics art. These also include that the vibration sensors need to operate in an oil environment, need to be able to withstand up to 160° C., and need to be able to withstand chemical attack from oil and additives. Consistency checks are carried out at beginning and end of each series of test runs. Measurements are taken during a run up from idle to max engine speed over a 60-sec ramp. A standard Rotec system may be used for data capture and analysis.

The Tensioner.

The invention comprises a tensioner comprising a base having a cylindrical portion extending axially, the cylindrical portion comprising a radially outer surface and a receiving portion that is radially inward of the radially outer surface, an eccentric arm pivotally engaged with the radially outer surface, a torsion spring disposed within the radially inward receiving portion, the torsion spring applying a biasing force to the eccentric arm, and a pulley journalled to the eccentric arm.

Figure 23:
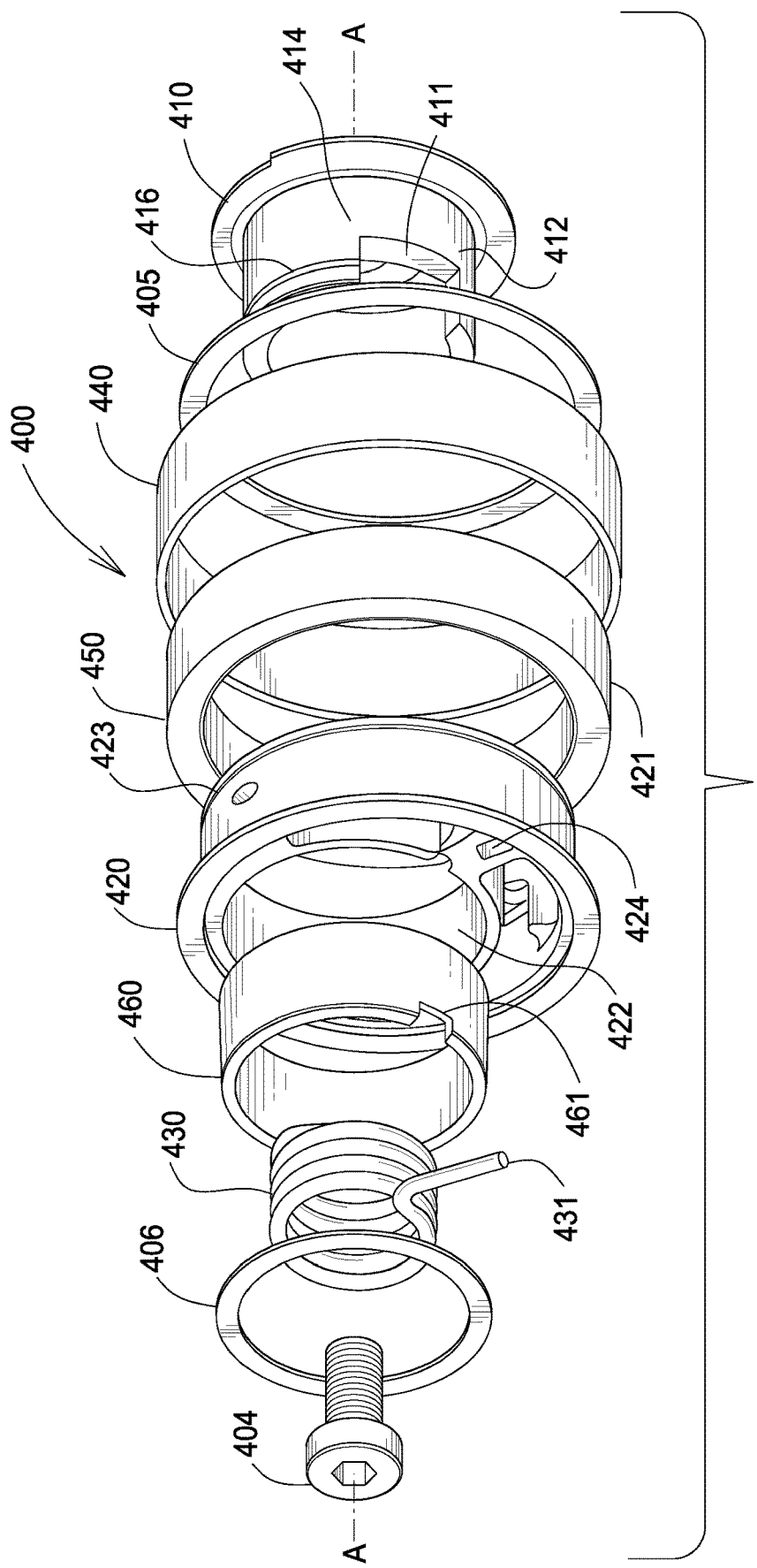
FIG. 23 is an exploded view of a tensioner.

FIG. 23 is an exploded view of the preferred tensioner. Tensioner 400 comprises a base 410. Base 410 comprises an axially extending cylindrical portion 412 having an outer surface 414. Cylindrical portion 412 further comprises an opening 411 and a receiving portion 418.

Eccentric arm 420 pivots about cylindrical portion 412. Bushing 460 is disposed between inner surface 422 and outer surface 414. Bushing 460 comprises a slot 461 which substantially aligns with opening 411 in cylindrical portion 412. Pulley 440 is journalled to surface 421 on a needle bearing 450. A needle bearing is used in an oil bath environment. Other bearings known in the art are suitable as well.

Torsion spring 430 engages and biases eccentric arm 420 toward a belt (not shown) in order to apply a belt load. End 431 projects through slot 461 and opening 411 to engage eccentric arm 420 receiving portion 424. End 432 engages a receiving portion 415 in base 410. Torsion spring 430 is entirely disposed within receiving portion 418. Receiving portion 418 is a central hollow portion of cylindrical portion 412. Torsion spring 430 is coplanar with bearing 450, pulley 440 and eccentric arm 420. Torsion spring 430 is disposed radially inward of pulley 440, bearing 450, bushing 460 and cylindrical portion 412. Namely, torsion spring 430, bearing 450, pulley 440 and eccentric arm 420 are all concentrically arranged such that no one of the listed components is axially displaced, along axis A-A, from the others.

Retaining ring 406 engages circumferential slot 416 in base 410. Retaining ring 405 engages circumferential slot 423 in eccentric arm 420. Retaining ring 405 retains bearing 450 on eccentric arm 420. Retaining ring 6 retains eccentric arm 420 on base 410. In the presence of oil retaining ring 405 and 406 can each act as a thrust washer to transmit axial forces.

Pulley 440 is press fit on bearing 450. Fastener 404 projects through torsion spring 430 and hole 417 in base 410 to fix tensioner 400 to a mounting surface such as an engine (not shown).

Bushing 460 comprises a dynamic coefficient of friction (COF) in the range of approximately 0.05 to approximately 0.20. A static COF is preferably lower than the dynamic COF.

Figure 24:
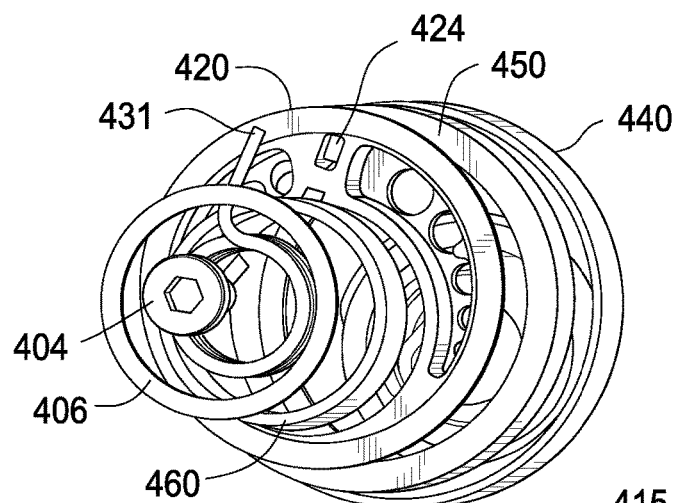
FIG. 24 is a top exploded view of the tensioner.

FIG. 24 is a top exploded view. Eccentric arm 420 pivots about the axis A-A, which axis is centered on cylindrical portion 412 and projects through fastener 404. Eccentric arm 420 pivots about axis A-A. Pulley 440 rotates about "B" which is the geometric center of eccentric arm 420. "B" is offset eccentrically from axis A-A thereby allowing eccentric pivotal movement of eccentric arm 420 which in turn allows tensioner 400 to apply a variable load to a belt (not shown).

Figure 25:
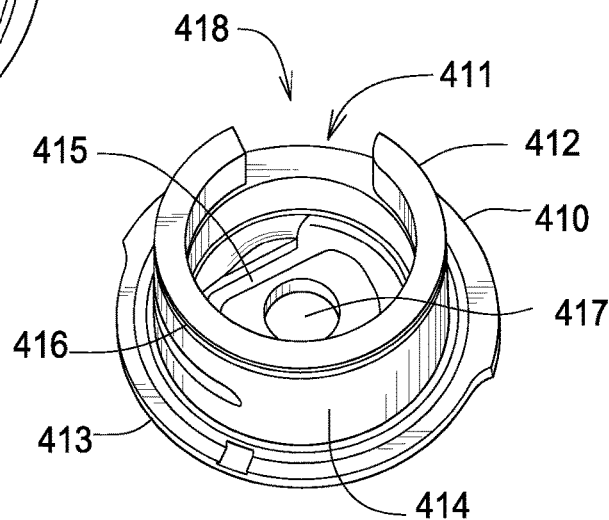
FIG. 25 is a perspective view of the base of the tensioner.

FIG. 25 is a perspective view of the base. End receiving portion 415 is disposed at one end of receiving portion 418 in base 410. End 432 engages receiving portion 415 thereby fixing end 432 and acting as a reaction point for the torsion spring.

Figure 26:
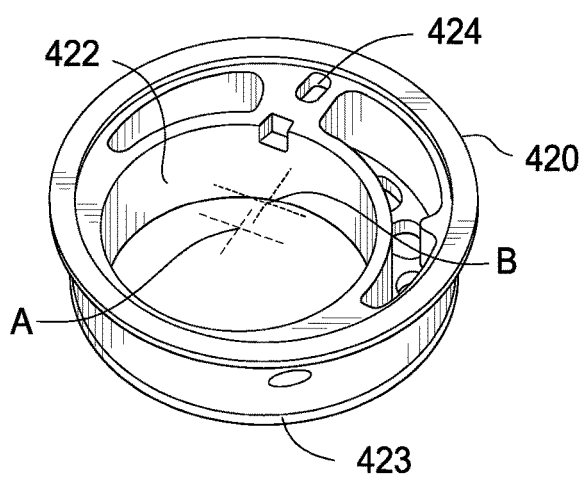
FIG. 26 is a perspective view of the eccentric arm of the tensioner.

FIG. 26 is a perspective view of the eccentric arm. "B" is the geometric center of pulley 420 and is the point about which pulley 440 rotates. Eccentric arm 420 pivots about "A" on axis A-A. Receiving portion 424 engages end 431 of spring 430.

Figure 27:
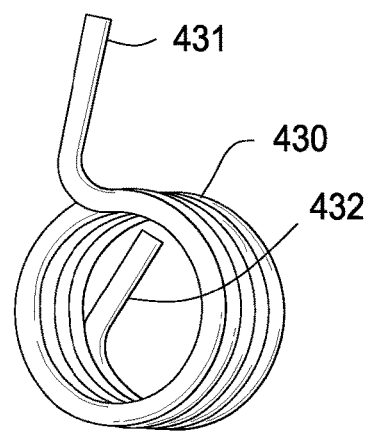
FIG. 27 is a perspective view of the torsion spring of the tensioner.

FIG. 27 is a perspective view of the torsion spring. End 431 projects into receiving portion 424 of eccentric arm 420. End 432 engages receiving portion 415.

Figure 28:
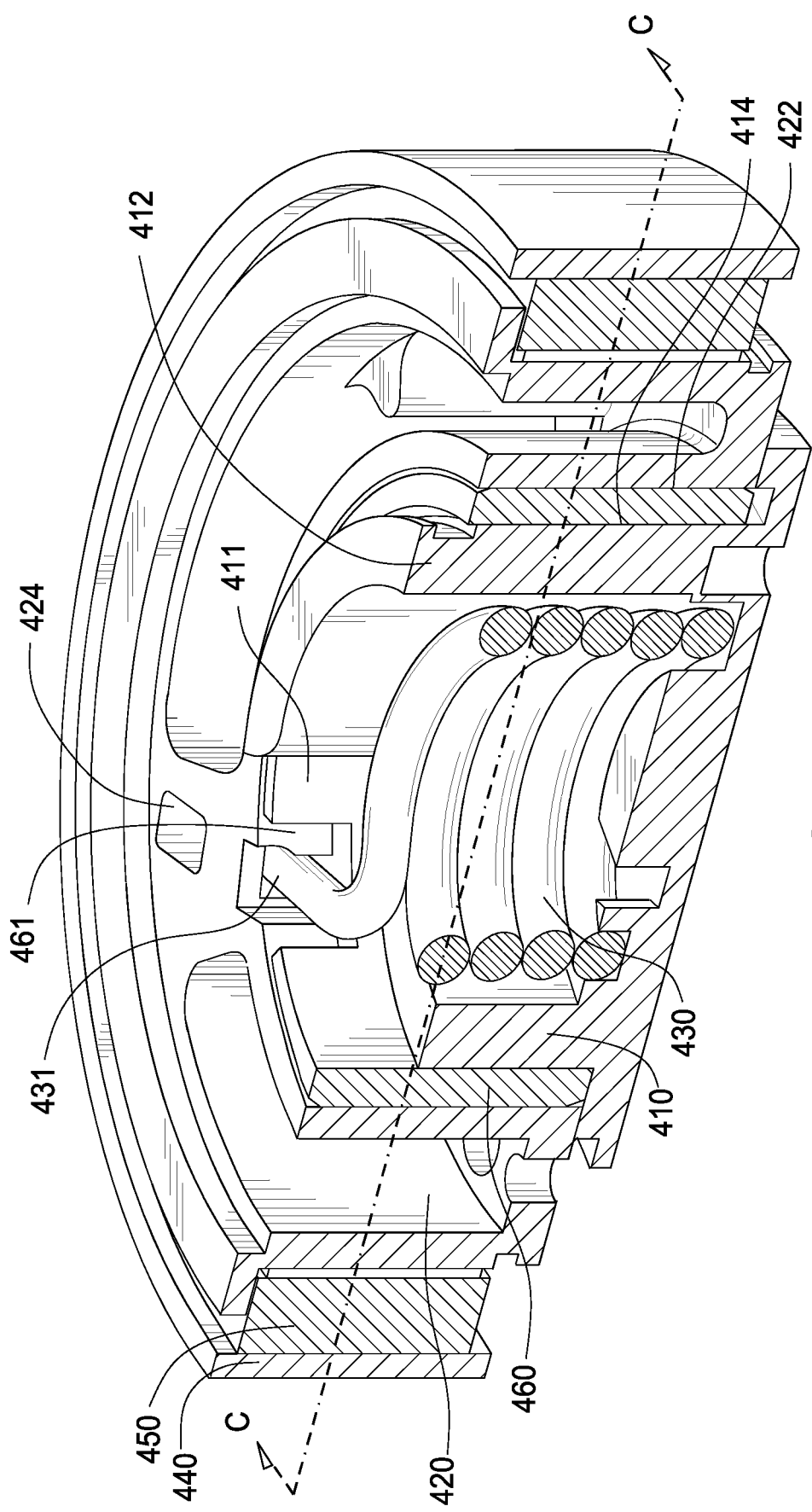
FIG. 28 is a cross-sectional view of the tensioner.

FIG. 28 is a cross-sectional view of the tensioner. Torsion spring 430, bushing 460, cylindrical portion 412, eccentric arm 420, bearing 450 and pulley 440 are all concentrically arranged such that no one of the listed components is axially displaced, along axis A-A, from the others. This fully concentric and nested arrangement minimizes the height (or width) of the tensioner allowing it to be used in very cramped applications.

Figure 29:
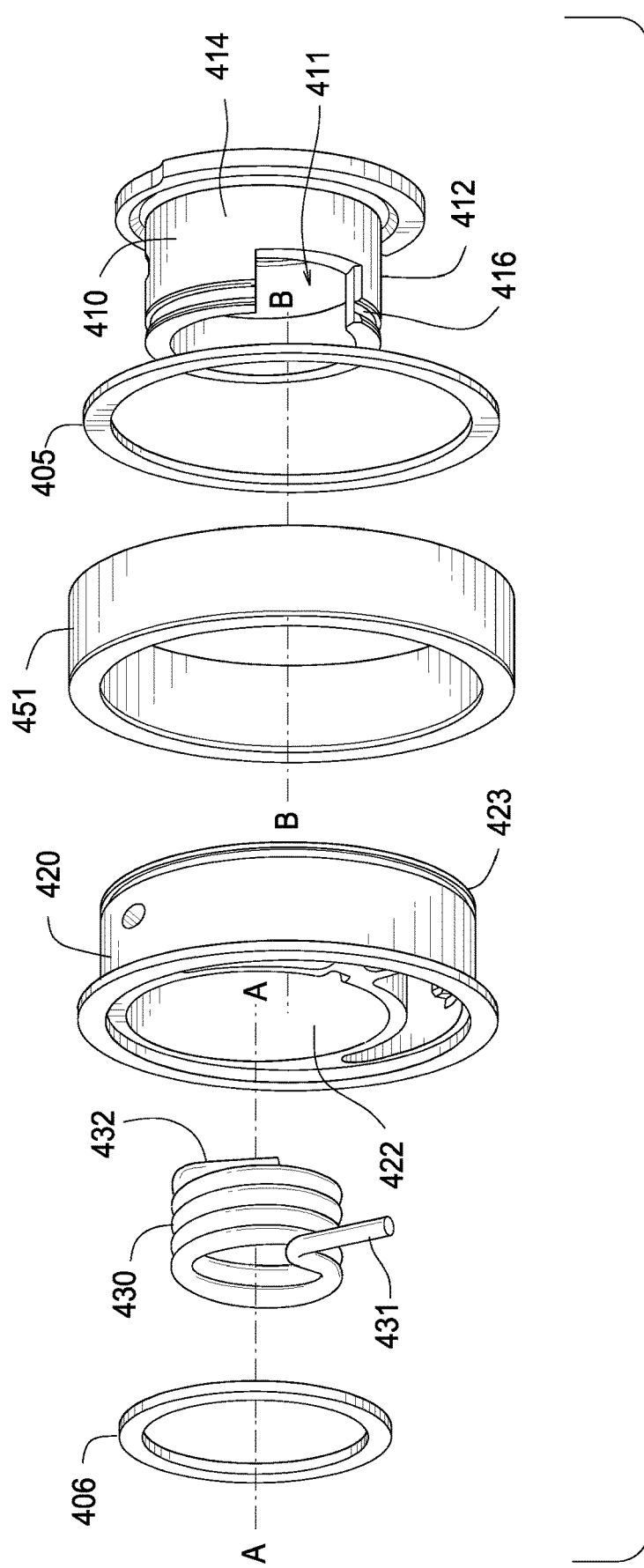
FIG. 29 is an exploded view of an alternate tensioner.

FIG. 29 is an exploded view of an alternate embodiment. The components are the same as described herein, with the exception that the bearing 451 is a plain bearing and bushing 460 is omitted. This alternate embodiment is configured to run in oil and/or is served with oil splash lubrication. Eccentric arm 420 pivots about axis A-A. Pulley 440 rotates about axis B-B see FIG. 26. Axis A-A is disposed away from axis B-B, and hence is not coaxial with axis A-A thereby allowing eccentric pivotal movement of eccentric arm 420.

Figure 30:
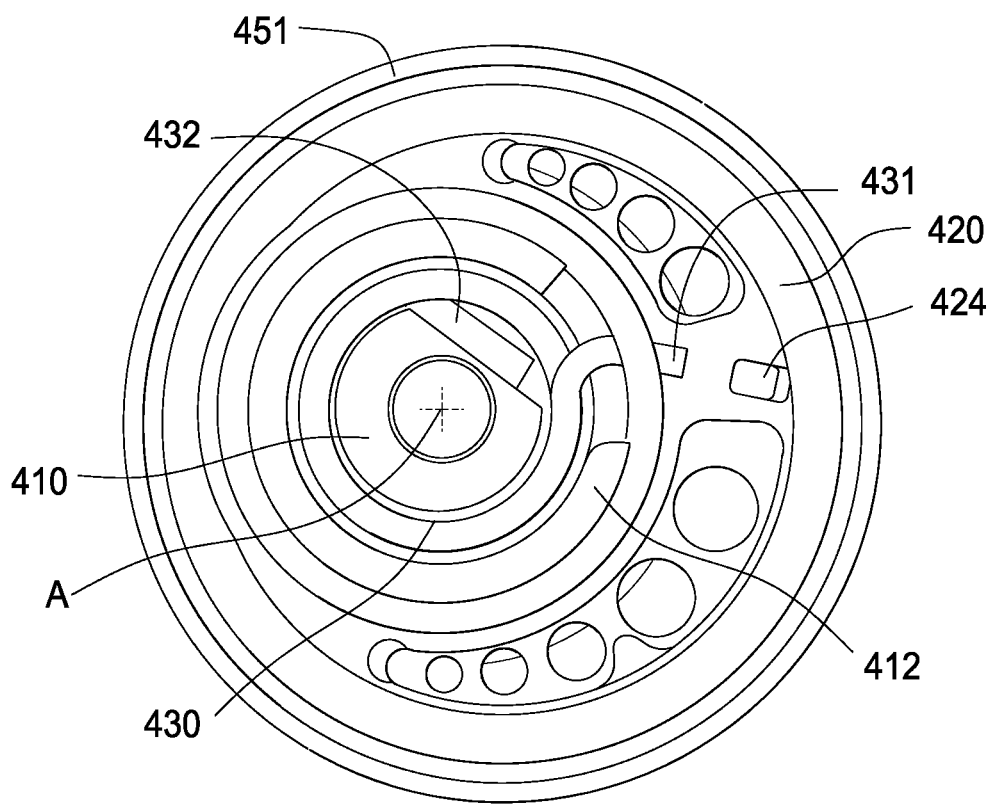
FIG. 30 is a top view of the alternate tensioner of FIG. 29.

FIG. 30 is a top view of the alternate embodiment of FIG. 29.

Figure 31:
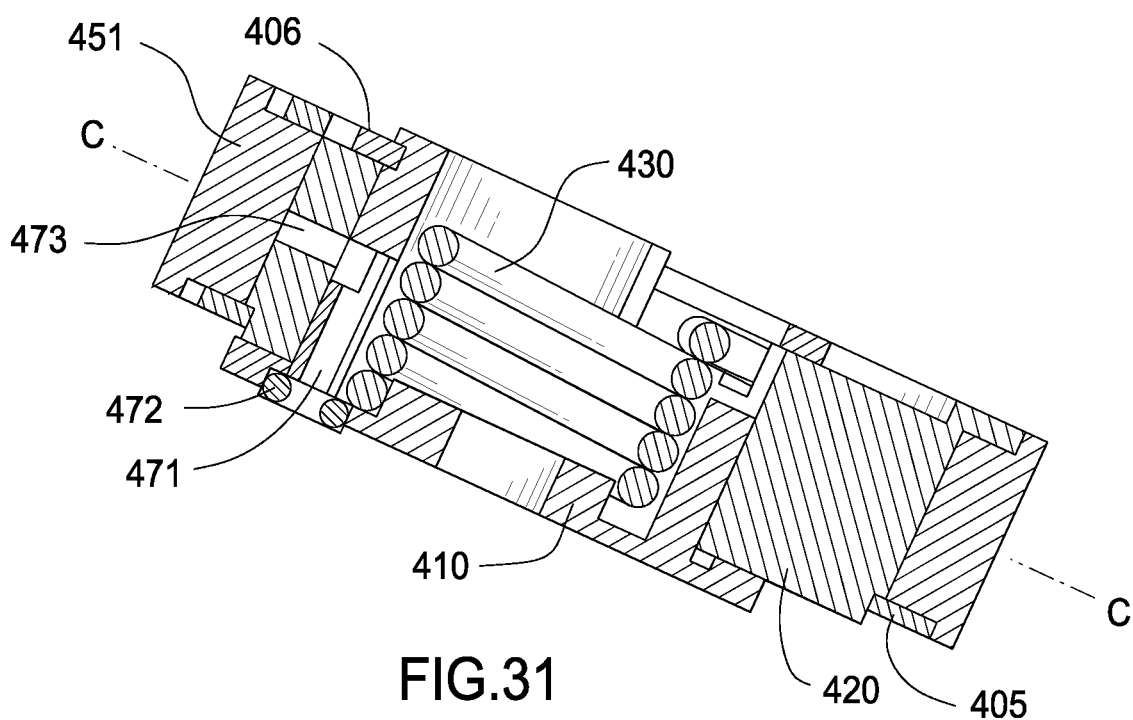
FIG. 31 is a cross-sectional view of the alternate tensioner of FIG. 29.

FIG. 31 is a cross-sectional view of the alternate embodiment of FIG. 29. Torsion spring 430, eccentric arm 420 and bearing 451 are concentrically arranged such that no one of the listed components is axially displaced, along axis A-A, from the others. Fluid conduit 471 in base 410 provides a path for a fluid such as oil to flow from the engine oil system (not shown) to bearing 451 via fluid conduit 473, thereby lubricating the bearing. O-ring 472 provides means to seal the connection to the engine oil system.

Figure 32:
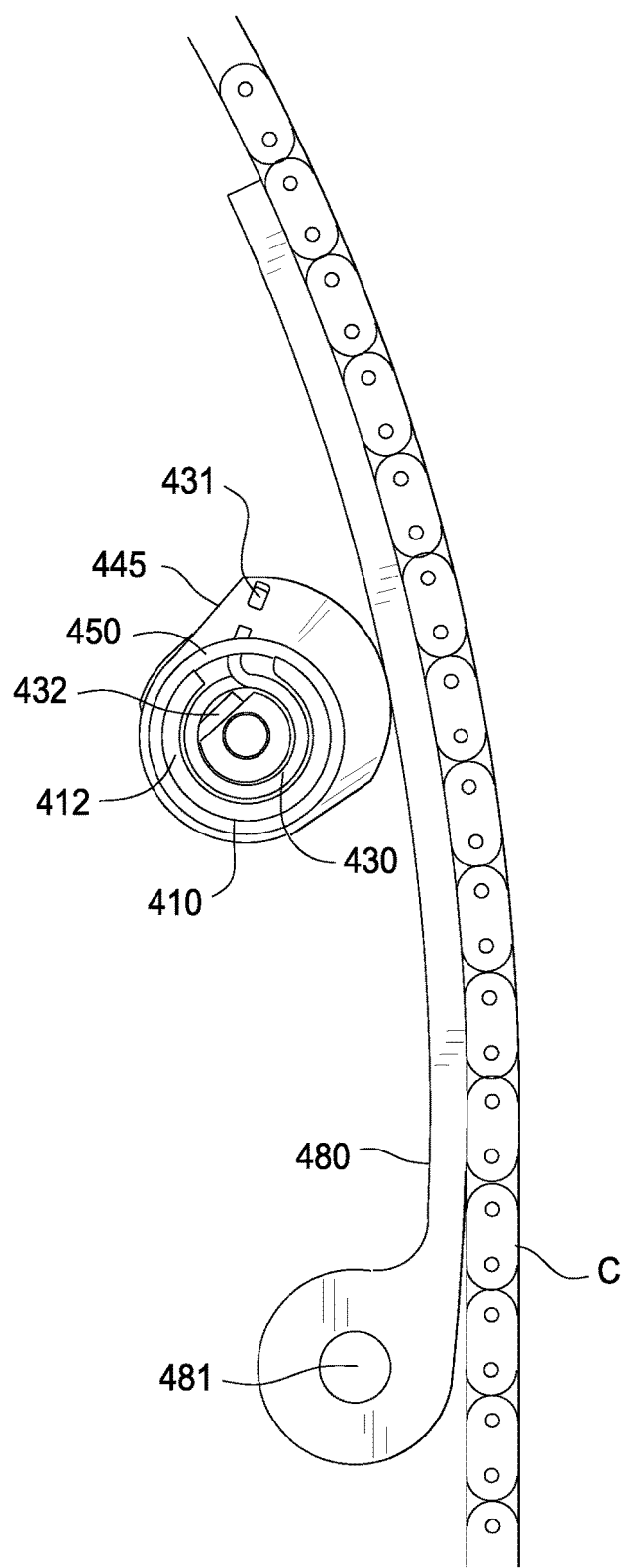
FIG. 32 is a side view of an alternate tensioner.

FIG. 32 is a side view of an alternate embodiment. Instead of an eccentric arm 420 and pulley 440, this alternate embodiment comprises a cam 445. Cam 445 operates on the same principle as eccentric arm 420 and it occupies the same position in the device. There is no pulley 440. Cam 445 engages an elongate member 480. Elongate member 480 may comprise any suitable low friction material known in the art. Elongate member 480 may also be referred to as a slide guide. A chain "C" slidingly engages a surface of slide guide 480. Pivot 481 is disposed at one end of the slide guide. Slide guide 480 pivots about pivot 481 in response to rotation of cam 445. Due to the eccentric form of surface 446 rotation of cam 445 causes slide guide 480 to pivot about 481 thereby maintaining a load on chain "C". This embodiment is useful in an internal combustion engine timing system by way of example. This embodiment may be used with a timing belt instead of a chain.

Figure 33:
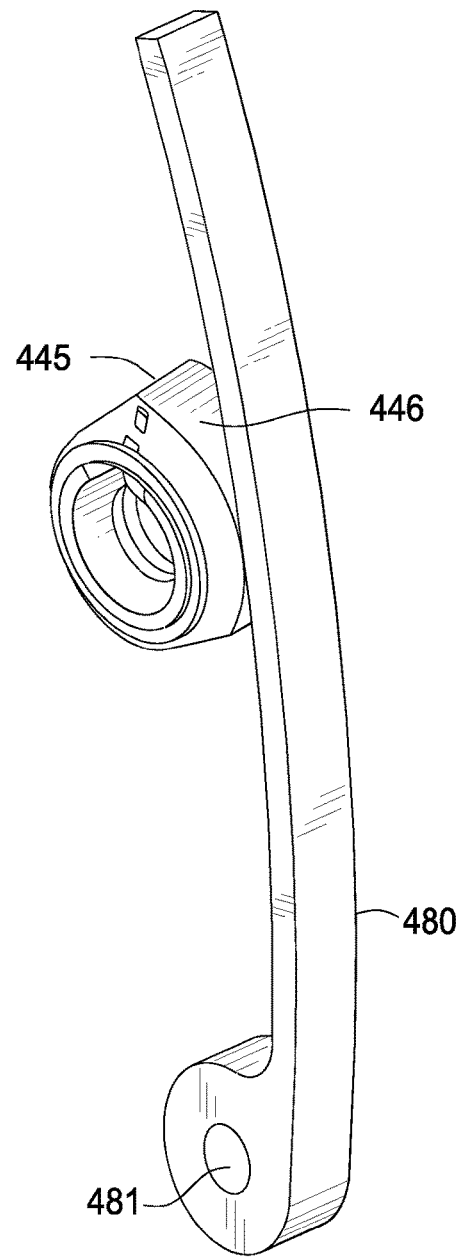
FIG. 33 is a perspective view of the alternate tensioner of FIG. 32.

FIG. 33 is a perspective view of the alternate embodiment in FIG. 32. Surface 446 of cam 445 engages slide guide 480.

The Synchronous Belt Drive System.

The inventive drive system includes a belt, at least one obround sprocket as described above, and a tensioner as described above. A drive system includes at least two sprockets, a driver sprocket and a driven sprocket. At least one of the driver and driven sprockets is obround as described herein. The tensioner is preferably designed as described herein and may utilize a backside idler pulley or a slider to contact a belt span.

In one embodiment, the synchronous belt drive system is an overhead cam drive for an internal combustion engine, for example, for an automobile or other land vehicle. Examples were introduced above and are illustrated in FIGS. 3-6. FIG. 3 and FIG. 6 represent exemplary dual, overhead-cam, drive systems, while FIG. 4 and FIG. 5 represent single, overhead-cam, drive systems. Each of these examples has the crank sprocket as the driver, and a one or more cam sprockets as a driven sprocket. Each drive also may include various backside idler arrangements and a water pump and a tensioner as described herein. The drive of FIG. 5 includes an injection pump. The drives may be for diesel or gas engines. In other embodiments, the drive may be for a single driven component such as a pump or a balance shaft, including for example, just a crank sprocket, a driven sprocket for the driven component, and the tensioner. In each case, and countless other variations of drive systems, the inventive principles described herein may be utilized to provide a synchronous drive system which can either run dry or in contact with oil or other engine fluids, and which may have a substantially narrower package width than previous drives.

The primary advantage of the tensioner design described above for the synchronous belt drive system is the compactness. In conventional belt drives, the tensioner is often the widest component, thus significantly limiting the overall package width. With the tensioner design described herein, the belt can be made as small as desirable and the tensioner and other sprockets can be practically the same width plus a small amount for clearance, or just slightly wider if one wishes to accommodate some run-out or potential misalignment.

The use of the obround sprocket or sprockets, in conjunction with the high-modulus timing belt, results in a drive that works surprisingly well with a narrow-width belt. Reducing belt width is generally associated in the art with increased tensions and loads (per unit width) on the belt, resulting in increased deflections in span length and tooth deflections, resulting in turn in poorer timing accuracy and poorer durability. However, the present systems can show much improved timing, associated with decreased tensions and loads on the belt, and sufficient durability.

Examples.

Figure 35:
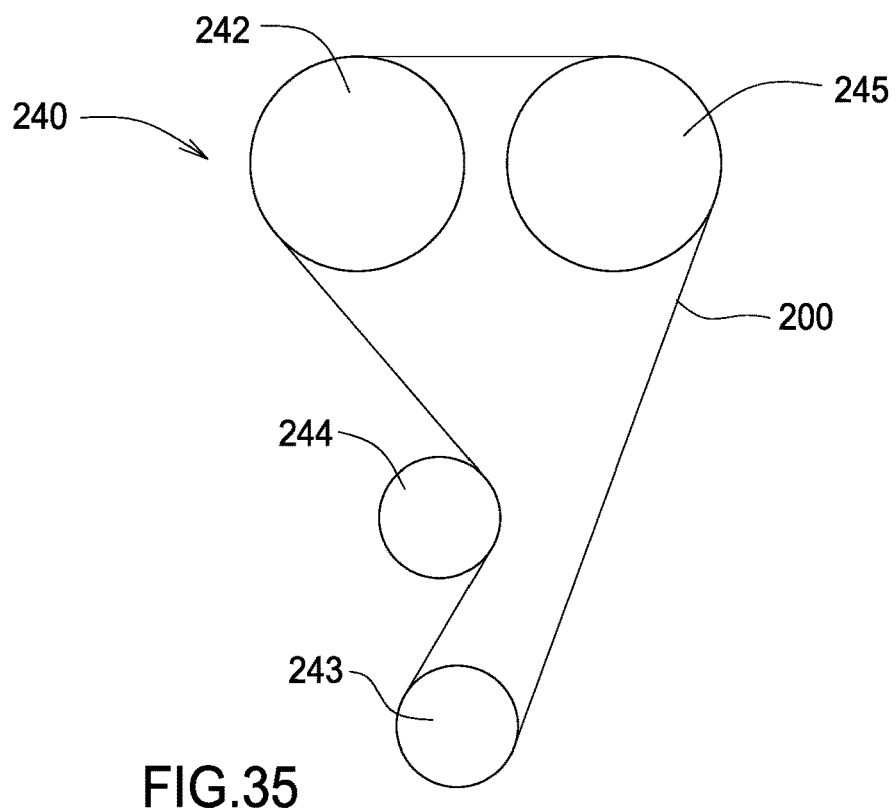
FIG. 35 is a diagram of a synchronous belt drive system used to test an aspect of the invention.

For each of the examples below, the test layout is a dual overhead cam drive on a three-cylinder engine that is driven by an electric motor coupled to the crankshaft as illustrated in FIG. 35. The 3-cylinder engine is known as the 1.0 L Fox engine produced by Ford Motor Company. The stock oil-wet timing drive system is modified to accommodate the various test drives described below. All are run oil-wet with Castrol Magnatec 5W-20 oil at an oil temperature of 140° C. The test layout 240, includes 19-groove driver or crank pulley 243 and two 38-groove driven cam pulleys 242, 245 with RPX groove profile and 9.525-mm pitch to match belt 200 which has an RPP tooth profile. The speed profile and the details of the belt width, pulleys and tensioner 244 were varied as described below.

Three exemplary belts shown in TABLE 1 were used in various system tests. Belt 1 is the stock belt for the 1.0 L FOX engine, as supplied by Dayco. Belt 2 is an oil-capable belt supplied by Gates Unitta Asia. Belt 3 is a modified version of Belt 2 in which the tensile cord is replaced with a hybrid cord of carbon-fiber wrapped with U-glass fiber (a high-strength glass).

Belt 1 is believed to be constructed as described in WO2005080820 by Dayco.

Belt 2 is believed to be constructed with the belt materials as described in U.S. Pat. Pub. No. 2014/0080647A1 to Yamada et al., which is incorporated herein by reference. The tooth fabric was a 2×2 twill woven with para-aramid/ nylon elastic stretch yarn in the weft and nylon in the warp. The tooth fabric was treated with an epoxy+NBR latex+ hardener treatment, as described in U.S. Pat. Pub. No. 2014/0080647A1 to Yamada et al. The treatment was applied by dipping and dried in a conventional oven. The back fabric was a woven, 2×2 twill, nylon 66, stretch fabric treated with NBR-latex-based RFL. The belt body (both tooth and back) rubber composition was based on a nitrile-group containing copolymer rubber, namely HNBR including of a short fiber reinforcement, resorcinol, and a melamine compound. The rubber composition of the belt body further included additional ingredients known in the art, including carbon black, some plasticizer, anti-degradants, curatives, and coagents. The tensile cord 18 for the belt of system A was twisted high-strength, fiber-glass yarns treated with NBR RFL treatment for resistance to oil for use in oil-wet environments.

Belt 3 is constructed the same as Belt 2 except for a different tensile cord. Belt 3 had the glass cord replaced by a hybrid carbon/glass cord as described in U.S. Pat. No. 7,682,274, i.e., a carbon-fiber core yarn surrounded by a plurality of high-strength-glass fiber yarns.

TABLE 1

|  | Belt 1 | Belt 2 | Belt 3 | Belt 4 | Belt 5 |
|---|---|---|---|---|---|
| Manufacturer | Dayco | Gates | Gates |  |  |
| Tensile cord | K-glass | U-glass | CF/U-glass hybrid |  |  |
| Jacket | stretch aramid/ nylon | semi-stretch aramid/ nylon | semi-stretch aramid/ nylon |  |  |
| Body rubber | HNBR | HNBR | HNBR |  |  |
| Tensile strength (kN/18 mm/strand) | 18.7 | 17.9 |  |  |  |
| Tensile stiffness (kN/mm/strain) |  | 20 | 33 |  |  |
| Tooth shear (N/18 mm) | 3.6 | 4.3 |  |  |  |

First Test Series of Comparative Systems.

The test layout for this first series of tests included the stock tensioner and pulleys that inertia-matched to the stock pulleys. The cam pulleys were round and cut with a 1.5-mm diametric pitch line differential (DPLD), and the crank pulley had a 1.45-mm DPLD. Both cam sprockets were inertia matched to the stock pulleys including the stock VVT apparatus. The tensioner 244 was a stock compact tensioner with a single eccentric center and symmetric damping, providing an installation tension of about 500 N and having a smooth 62-mm diameter pulley. The tensioner pulley face width was 24.5 mm, and the overall width of the tensioner was about 36 mm. This was the widest component, so the overall comparative drive package width was about 36 mm. The crank speed was varied between 5000 and 6000 rpm, alternately ramping up for 10 s and down for 10 s.

Five drive systems were tested, as indicated in TABLE 2, and a result for a sixth system was predicted base on the other five. Only the belt was varied in this series. Belt 1 was used at three different widths, 18 mm, 12 mm, and 10 mm. Belt 2 was used at two different widths, 18 mm and 10 mm, and a result was predicted for 12-mm width. Two similar test rigs were used. The systems were run to a fixed time for Comparative ("Comp.") System 1 & 2 and till belt failure for the other systems. The results for systems 3 and 6 indicate that Rig 1 typically gave a little longer run time than Rig 2. Such variation in system testing is not unusual. These tests were used as a baseline for tests of the inventive system. Further testing was done with 10-mm wide belts due to the goal of minimizing system package size and the desire to avoid excessively long run times.

TABLE 2

|  | Comp. System 1 | Comp. System 2 | Comp. System 3 | Comp. System 4 | Comp. System 5 | Comp. System 6 |
|---|---|---|---|---|---|---|
| Belt Construction[1] | Belt 1 | Belt 2 | Belt 1 | Belt 2 | Belt 1 | Belt 2 |
| belt width (mm) | 18 | 18 | 12 | 12 | 10 | 10 |
| Run time (hrs) Rig 1 | — | — | 2300 | >2000[3] | — | 1300 |
| Run time (hrs) Rig 2 | 1240[2] | 1240[2] | 1800 | — | 497 | 777 |
| Wear indications | root cracks | moderate abrasion |  |  |  |  |
| Retained tensile strength (%)[4] | 43 | 51 |  |  |  |  |

TABLE 2-continued

|  | Comp. System 1 | Comp. System 2 | Comp. System 3 | Comp. System 4 | Comp. System 5 | Comp. System 6 |
|---|---|---|---|---|---|---|
| Retained Tooth shear (%)[4] | 69 | 60 | | | | |

[1]See Table 1.
[2]Test was suspended without belt failure.
[3]Predicted life.
[4]for systems 3, 5, and 6, the belt was run to complete failure, so no tensile test was possible.

Second Test Series of Comparative Versus Inventive Systems.

The test layout for this second series of tests was the same as the first series, i.e., as shown in FIG. 35, however the test rig was a third rig, i.e., rig 3. Rig 3 differed from rigs 1 and 2 in that the stock flywheel was included on rig 3 but not on rigs 1 and 2. Two drive systems were tested on Rig 3, as indicated in TABLE 3. Comp. System 7 included the stock tensioner and pulleys that were inertia matched to the stock pulleys. The cam pulleys were round and cut with a 1.5-mm diametric pitch line differential (DPLD), and the crank pulley had a 1.45-mm DPLD. Both cam sprockets were inertia matched to the stock pulleys including the stock VVT apparatus. The tensioner 244 was a stock compact tensioner with a single eccentric center and symmetric damping, providing an installation tension of about 500N and having a smooth 62-mm diameter pulley. The tensioner pulley face width was 24.5 mm, and the overall width of the tensioner was about 36 mm. This was the widest component, so the overall comparative drive package width was about 36 mm. For this series of tests, the crank speed was held constant at 4750 rpm for the duration of each test (which is approximately the speed of maximum resonance). Belt 2 was used for Comp. System 7, with 10-mm width, 116 teeth of RPP profile and a pitch of 9.525 mm.

Inventive System 8 had the same test layout, however the cam sprockets were obround and cut with a 1.5-mm diametric pitch line differential (DPLD). The obround intake cam sprocket 242 is 3-lobed as shown in FIG. 2, with a magnitude of eccentricity of 0.75-mm and phased at 13 g cw, i.e., with an angular offset of 13 grooves in the clockwise direction from the datum position on the engine. The obround exhaust cam sprocket 245 is 3-lobed as shown in FIG. 2, with a magnitude of 1.0-mm and phased at 23.5 g cw, i.e., with an angular offset of 23.5 grooves in the clockwise direction from the datum point. Both cam sprockets are inertia matched to the stock pulleys.

The tensioner 244 for System 8 was a compact tensioner according to the design described herein, with a single eccentric center providing an installation tension of about 500 N and having a smooth 60-mm diameter pulley. The tensioner thus had a pulley face width of 14 mm, and an overall width of about 16 mm. The tensioner also had about 300 N of asymmetric damping as described for example in U.S. Pat. No. 6,609,988 B1 to Liu et al.

The crank pulley was the same, i.e., with reduced face width to fit the narrow belt and package width.

Belt 3 was used for System 8, with 10-mm width, 116 teeth of RPP profile and a pitch of 9.525 mm.

The two systems were run till belt failure occurred. The results are shown in Table 3. The run time for Comp. System 7 at 690 hours is consistent with the result for Comp. System 6 at 777 hours. The inventive System 8 result is almost twice the run time at 1266 hours. This demonstrates that the combination of narrow, high-modulus belt, with obround sprockets and special narrow tensioner can significantly increase belt life.

Table 3 includes some timing error results, including before and after the test. The improved timing error results can be considered a combination of effects, including the effect of higher belt modulus, the effect of the tensioner design, and the effect of obround sprockets. Table 3 shows some of these individual effects from other testing, some of which were done on 12-mm wide belts as indicated in Table 3. The final result is a very narrow (10-mm belt) system with maximum timing errors well under 1° peak-to-peak throughout the belt life.

In addition, Table 3 indicates that the effective tension of the belt in the system is substantially reduced, from 500 N to about 250 N, and this effect is mostly due to the obround sprocket. This favorable effect of obround pulleys is quite significant. It allows the installation tension to be reduced without risking tooth jumping, which in turn should reduce the rate of land wear.

The results for systems 7 and 8 thus indicate the superior overall system performance and belt life when a high-modulus belt is combined with the obround sprockets and the concentric tensioner. It is believed the results could be improved even further by optimizing the installation tension. The obround sprocket significantly reduced the Effective Tension at the crank which would normally extend the belt life for a tooth-shear failure mode. However, since the observed failure mode was land wear (which is more related to PV (contact pressure times slip velocity) in the system), the positive effect of the obround sprocket on belt life is reduced. In other words, the belt life could have been further increased if we had used the obround sprocket to partially reduce effective tension (i.e., reduced tooth load) but had also reduced the installation tension (i.e., a lower PV between belt and pulley).

The 10-mm belt width was chosen to accelerate the testing. From these results and other experience with correlations between accelerated tests and more realistic applications, it is believed that increasing the belt width to about 14 mm would result in a durability of system 8 on the test rig of about 3500 hours which is expected to correlate with a life on a vehicle of about 240,000 km. A 14-mm belt width could be accommodated on the tensioner and pulleys as described giving a total drive package width on the order of 18 mm or less, which is about half the package width of the conventional drive with stock components. It is also estimated that this drive system could easily be made around 30% lighter than the conventional drive system with stock components.

TABLE 3

|  | Comp. System 7 | System 8 |
|---|---|---|
| Belt Construction[1] | Belt 2 | Belt 3 |
| belt width (mm) | 10 | 10 |
| Run time (hrs) Rig 3 | 690 | 1266 |
| Wear indications | land wear | land wear |
| Retained Tensile stiffness (%) | 19 kN/mm | 38 kN/mm |
| Peak timing error on round sprockets, belt effect[2] (° peak-to-peak, Inlet/Exhaust) | 2.1/2.2 | 1.8/1.7 |
| Peak timing error on round sprockets, tensioner effect (° peak-to-peak, Inlet/Exhaust) | — | 1.8/1.9 w/o 1.5/1.5 w/ |
| Peak timing error, effect of obround sprockets[2] | 1.7/1.7 w/o 0.9/1.0 w/ | 1.4/1.5 w/o 0.5/0.6 w/ |

TABLE 3-continued

|  | Comp. System 7 | System 8 |
|---|---|---|
| (° peak-to-peak, Inlet/Exhaust) | | |
| Peak effective tension, effect of obround sprockets (N) | 500 w/o 250 w/ | 500 w/o 250 w/ |
| Peak timing error-system (° peak-to-peak, Inlet/Exhaust) start of test | 1.8 | 0.8/0.8 |
| end of test | 1.8 | 0.8/0.9 |
| Effective tension throughout testing (N) | 250 | 250 |

[1] See Table 1.
[2] separate tests with 12-mm wide belts.

Some additional aspects of the invention related to the obround sprocket(s) in particular may be listed next.

Aspect 1. The invention relates to a synchronous belt drive system comprising: a first obround sprocket (10) having a toothed surface and at least one linear portion (16) disposed between two arcuate portions (14,15), the arcuate portions having a constant radius (R1, R2), the linear portion having a predetermined length; a sprocket (300) having a toothed surface, the sprocket engaged to the first obround sprocket by an endless toothed member (200); and the first obround sprocket (10) having a magnitude and a phase such that an angular displacement timing error between the sprocket and the first obround sprocket is less than 1.5 degree peak to peak.

Aspect 2. The synchronous belt drive system as in aspect 1 further comprising: a second obround sprocket connected to a second rotary load, the second obround sprocket engaged with the endless toothed member; and the second obround sprocket having a magnitude and a phase such that an angular displacement timing error between the sprocket and the second obround sprocket is less than 1.5 degree peak to peak.

Aspect 3. The synchronous belt drive system as in aspect 1, wherein the angular displacement timing error between the sprocket and the first obround sprocket is less than 0.5 degree peak to peak.

Aspect 4. The synchronous belt drive system as in aspect 3, wherein the angular displacement timing error between the sprocket and the second obround sprocket is less than 0.5 degree peak to peak.

Aspect 5. The synchronous belt drive system as in aspect 1, wherein a width of the endless toothed member is equal to or greater than 12 mm.

Aspect 6. The synchronous belt drive system as in aspect 1, wherein the endless toothed member comprises a modulus in the range of about 630,000N to about 902,000N.

Aspect 7. The synchronous belt drive system as in aspect 1, wherein the magnitude is in the range of approximately 1.0 mm to 1.5 mm.

Aspect 8. The synchronous belt drive system as in aspect 1, wherein the phase of the first obround sprocket is in the range of 9 grooves to 25 grooves when rotated relative to a datum point.

Aspect 9. The synchronous belt drive as in aspect 8, wherein the datum point is with respect to a 3 o'clock position.

Aspect 10. The synchronous belt drive system as in aspect 2, wherein the phase of the second obround sprocket is in the range of 9 grooves to 25 grooves when rotated relative to a datum point.

Aspect 11. The synchronous belt drive as in aspect 10, wherein the datum point is with respect to a 3 o'clock position.

Aspect 12. The synchronous belt drive system as in aspect 10, wherein the phase of the first obround sprocket is in the range of 9 grooves to 25 grooves when rotated relative to a datum point.

Aspect 13. The synchronous belt drive as in aspect 12, wherein the datum point is with respect to a 3 o'clock position.

Aspect 14. The synchronous belt drive system as in aspect 1, wherein the sprocket is connected to a driver and the first obround sprocket is connected to a rotary load.

Aspect 15. The synchronous belt drive system as in aspect 14, wherein the driver is an engine crankshaft.

Aspect 16. The synchronous belt drive system as in aspect 2, wherein the first obround sprocket is connected to an exhaust camshaft.

Aspect 17. The synchronous belt drive system as in aspect 2, wherein the second obround sprocket is connected to an inlet camshaft.

Aspect 18. The invention also relates to a synchronous belt drive system comprising: a first obround sprocket having a toothed surface and at least one linear portion disposed between two arcuate portions, the arcuate portions having a constant radius, the linear portion having a predetermined length; a sprocket having a toothed surface, the sprocket engaged to the first obround sprocket by an endless toothed member; the first obround sprocket having a magnitude and a phase such that an angular displacement timing error between the sprocket and the first obround sprocket is less than 1 degree peak to peak; a second obround sprocket connected to a second rotary load, the second obround sprocket engaged with the endless toothed member; and the second obround sprocket having a magnitude and a phase such that an angular displacement timing error between the sprocket and the second obround sprocket is less than 1.5 degree peak to peak.

Aspect 19. The synchronous belt drive system as in aspect 18, wherein the first obround sprocket is connected to an exhaust camshaft and wherein the second obround sprocket is connected to an inlet camshaft and the sprocket is connected to an engine crankshaft.

Aspect 20. The synchronous belt drive system as in aspect 19, wherein the angular displacement timing error between the sprocket and the first obround sprocket is less than 0.5 degree peak to peak, and wherein the angular displacement timing error between the sprocket and the second obround sprocket is less than 0.5 degree peak to peak.

Some additional aspects of the invention related to the tensioner in particular may be listed next.

Aspect 1. The invention relates to a tensioner comprising: a base having a cylindrical portion extending axially, the cylindrical portion comprising a radially outer surface and a receiving portion that is radially inward of the radially outer surface; an eccentric arm pivotally engaged with the radially outer surface; a torsion spring disposed within the radially inward receiving portion, the torsion spring applying a biasing force to the eccentric arm; and a pulley journalled to the eccentric arm.

Aspect 2. The tensioner as in aspect 1, wherein the pulley is journalled on a needle bearing.

Aspect 3. The tensioner as in aspect 1, wherein the eccentric arm, the pulley and the torsion spring are concentrically arranged such that no one of the eccentric arm, pulley or torsion spring is axially displaced along an axis A-A from the others.

Aspect 4. The tensioner as in aspect 1, wherein the eccentric arm is journalled to the base on a bushing.

Aspect 5. The invention also relates to a tensioner comprising: a base cylindrical portion having a radially outer surface and a radially inward receiving portion; an eccentric arm pivotally engaged with the radially outer surface; a torsion spring disposed within the radially inward receiving portion, the torsion spring applying a biasing force to the eccentric arm; and an elongate member engaged with the eccentric arm and disposed to pivot in response to a rotation of the eccentric arm.

Aspect 6. The tensioner as in aspect 5, wherein the eccentric arm and the torsion spring are concentrically arranged such that no one of the eccentric arm or torsion spring is axially displaced along an axis A-A from the others.

Aspect 7. The tensioner as in aspect 5, wherein the eccentric arm is journalled to the base on a bushing.

Aspect 8. The tensioner as in aspect 5, wherein the pulley is journalled to the eccentric arm on a needle bearing.

Aspect 9. The invention also relates to a tensioner comprising: a base having a cylindrical portion extending axially, the cylindrical portion comprising a radially outer surface and a radially inward receiving portion; an eccentric arm pivotally engaged with the radially outer surface; a torsion spring disposed within the radially inward receiving portion, the torsion spring applying a biasing force to the eccentric arm; a pulley journalled to the eccentric arm; and wherein the eccentric arm, the pulley and the torsion spring are concentrically arranged such that no one of the eccentric arm, pulley or torsion spring is axially displaced along an axis A-A from either of the eccentric arm, pulley or torsion spring.

Aspect 10. The tensioner as in aspect 9, wherein the base further comprises a fluid conduit whereby a fluid may access the bearing.

Aspect 11. The tensioner as in aspect 9, wherein the pulley is journalled on a bearing.

Aspect 12. The tensioner as in aspect 11, wherein the bearing comprises a needle bearing.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A synchronous belt drive system comprising:
   a synchronous belt (200) having a tensile cord comprising a high-modulus fiber;
   a driver sprocket and at least one driven sprocket, at least one of which is an obround sprocket (10); and
   a tensioner comprising a base having a cylindrical portion extending axially, the cylindrical portion comprising a radially outer surface and a receiving portion that is radially inward of the radially outer surface; an eccentric arm pivotally engaged with the radially outer surface; a torsion spring disposed within the radially inward receiving portion, the torsion spring applying a biasing force to the eccentric arm; and a pulley journalled to the eccentric arm.

2. The synchronous belt drive system of claim 1 wherein the eccentric arm, the pulley, and the torsion spring are concentrically arranged such that no one of the eccentric arm, pulley, or torsion spring is axially displaced along an axis A-A from the others.

3. The synchronous belt drive system of claim 1 wherein the obround sprocket (10) comprises a toothed surface and at least one linear portion (16) disposed between two arcuate portions (14,15), the arcuate portions having a constant radius (R1, R2), the linear portion having a predetermined length.

4. The synchronous belt drive system of claim 1 wherein the obround sprocket (10) has a magnitude and a phase such that an angular displacement timing error between the driver sprocket and the driven sprocket is less than 1.5 degree peak to peak.

5. The synchronous belt drive system of claim 1 wherein the high-modulus fiber is one or more selected from the group consisting of glass fiber, PBO, aramid, and carbon fiber.

6. The synchronous belt drive system of claim 1 wherein the high-modulus fiber is high-strength-glass fiber.

7. The synchronous belt drive system of claim 1 wherein the high-modulus fiber is carbon fiber.

8. The synchronous belt drive system of claim 1 wherein the tensile cord is a hybrid cord comprising carbon fiber and glass fiber.

9. The synchronous belt drive system of claim 1 defining an overall system package width less than 20 mm.

10. The synchronous belt drive system of claim 1 defining an overall system package width of 18 mm or less.

11. The synchronous belt drive system of claim 1 defining an overall system package width of 16 mm or less.

12. The synchronous belt drive system of claim 1 the synchronous belt has a width of about 14 mm or less.

* * * * *